(12) United States Patent
Gregory

(10) Patent No.: US 10,060,635 B2
(45) Date of Patent: Aug. 28, 2018

(54) HEAT TRANSFER THROUGH INTERIOR CLADDING OF LIVING SPACES

(71) Applicant: Bruce Gregory, London (GB)

(72) Inventor: Bruce Gregory, London (GB)

( * ) Notice: Subject to any disclaimer, the term of this patent is extended or adjusted under 35 U.S.C. 154(b) by 971 days.

(21) Appl. No.: 13/969,547

(22) Filed: Aug. 17, 2013

(65) Prior Publication Data

US 2015/0047805 A1    Feb. 19, 2015

(51) Int. Cl.
| | | |
|---|---|---|
| H01B 17/56 | (2006.01) | |
| F24D 3/14 | (2006.01) | |
| E04F 15/04 | (2006.01) | |
| E04F 13/16 | (2006.01) | |
| E04F 15/10 | (2006.01) | |
| E04F 13/14 | (2006.01) | |

(52) U.S. Cl.
CPC .............. *F24D 3/14* (2013.01); *E04F 13/148* (2013.01); *E04F 13/16* (2013.01); *E04F 15/041* (2013.01); *E04F 15/107* (2013.01); *F24D 3/148* (2013.01)

(58) Field of Classification Search
CPC .......... F24D 3/14; F24D 3/148; E04F 13/148; E04F 13/16; E04F 15/041; E04F 15/107; E04F 2290/02; B32B 2307/30; B32B 2307/302; B32B 2307/304; B32B 2307/306; B28B 1/54; F04F 2290/023
USPC ............................ 156/53; 165/53–55; 264/35
See application file for complete search history.

(56) References Cited

U.S. PATENT DOCUMENTS

| | | | | |
|---|---|---|---|---|
| 2,658,878 A | * | 11/1953 | Sears .................. | C08L 97/02 106/18.12 |
| 2,681,796 A | * | 6/1954 | Rapp .................. | F24D 3/142 165/144 |
| 5,788,152 A | * | 8/1998 | Alsberg ............. | F24D 3/142 165/56 |
| 2009/0255205 A1 | * | 10/2009 | Noble ................. | B32B 3/10 52/630 |
| 2010/0313504 A1 | * | 12/2010 | Li ........................ | E04F 15/04 52/220.2 |
| 2012/0301727 A1 | * | 11/2012 | Kim .................... | B32B 15/08 428/414 |
| 2013/0099013 A1 | * | 4/2013 | Asmussen ......... | F28F 13/18 237/69 |

FOREIGN PATENT DOCUMENTS

EP        0089012      *    6/1986

* cited by examiner

*Primary Examiner* — William V Gilbert

(57) ABSTRACT

The efficiency of radiant space heating or cooling is improved and the use of renewable energy sources enabled by reducing the resistance of the thermal path through cladding used in the floor, walls or ceiling of a domestic or commercial living space. The resistance of the thermal path is reduced by constructing the cladding with an array of thermal bridges each comprising a thermal shunt connected to a heat-collecting layer and to a heat-dispersing layer. Such bridged cladding extends the range of choice of interior cladding and of configuration of radiant system.

11 Claims, 12 Drawing Sheets

HEAT TRANSFER THROUGH INTERIOR CLADDING OF LIVING SPACES

RELATED APPLICATIONS

This application is based on my patent application GB 1214909.2 of 21 Aug. 2012, which is incorporated by reference.

FIELD OF INVENTION

Radiant heating and cooling applied to domestic and commercial living and working spaces.

More specifically, the present invention concerns the use of thermal bridging to improve heat transfer through a number of forms of interior cladding:
Plasterboard
Screed
Fiberboard
Particleboard
Oriented Strand Board
Plywood
Engineered wood flooring
Laminate flooring
Carpet underlay
Tufted carpet and carpet tiles Efficient thermal bridging enables the beneficial application of low temperature hydronic radiant systems (LTRHS).

BACKGROUND OF INVENTION

Cited Patents

DE7408063, 1974: Bosch
EP0133631, 1983: Evans
EP0089012, 1983: Wenger
DE3511510, 1986: Wenger
DE3710060, 1987: Wenger
DE3211970, 1983: Pirchl
DE2535522, 1975: Pruefling
DE2538830, 1977: Hahn
DE2621938, 1977: Hahn
NL1034848, 2007: Senden
US59311381, 1997: Fiedrich
US2010/0313504: Li
US2012/0301727: Chul et al
US2013/0099013: Asmussen Energy Saving The invention disclosed here applies thermal bridging to reduce the temperature drop across multiple forms of interior cladding. This enables the use of low-temperature radiant heating systems (LTRHS) (and high temperature radiant cooling systems), thereby:
improving efficiency of energy use in heating and cooling living spaces.
enabling efficient use of renewable heat sources.

In both instances, there is an associated reduction in carbon emissions.

Energy saving in residential and commercial space heating is a significant opportunity since space heating is a large component of total national energy use. For example, in the US, such space heating is around 12% of total energy use. In the UK the equivalent figure is approximately 18%.

Choice of Radiant Systems and Cladding

Additionally, the invention enables a wider choice of radiant systems for living spaces and of cladding systems for living spaces, where cladding means any individual layers or laminated multiple layers of material installed on or in the interior floor, wall or ceiling, including layers that are load-bearing, insulating, protective or decorative. Living spaces include all spaces both domestic and commercial that are heated or cooled for human or animal comfort.

Benefits of LTHRS

The efficiency of space heating can be improved by using a low-temperature hydronic radiant system (LTHRS). A similar radiant system can be adapted to cooling.

A LTHRS delivers heat using surface temperatures typically between 21 and 25 degrees C. and using large radiant areas: usually floor, wall or ceiling surfaces.

The energy-saving benefits of a LTHRS are:
Boiler efficiency raised by around 25%.
The low temperature of return water allows effective recovery of heat from the exhaust gases of a condensing boiler, especially the latent heat of condensing water vapor.
Efficient use of a heat pump.
A heat pump moves heat from a lower temperature renewable heat source (such as the ground, the air or a pond: all indirect sources of solar heat) to a higher temperature destination. The amount of electricity required to deliver a given quantity of heat by electrical resistive heating divided by the amount of electricity required to drive the heat pump to deliver the same quantity of heat is called the Coefficient of Performance (COP). The COP of a pump falls as the difference in temperature between heat source and heat destination rises. For example, if the heat source is ground at 5 degrees C. and the destination is a LTHRS with water at 35 degrees C., then a typical modern heat pump COP is around 4. The COP for a heat destination at say 70 degrees C.—a temperature typical of conventional wall radiator panels—is around 2 ie the efficiency gain from using a LTHRS is 100%. Every degree reduction in temperature of operation of a LTHRS improves heat pump efficiency by around 3%.
Efficient use of solar thermal heating.
Modern evaporative solar thermal systems can deliver and store water at 30-40 degrees C. even in winter with outside temperatures as low as minus 8 degrees C. Water at these temperatures can be used in a LTHRS without supplementary heating.
Efficient use of waste heat and geothermal heat.
Low temperature waste heat and geothermal heat can be used in a LTHRS.
Efficient control.
A LTHRS can be configured to have low thermal mass, enabling it to be controlled to be responsive to varying outside temperatures. The estimated efficiency improvement compared with high thermal mass systems is around 5%.
Efficient provision of comfort.
The floor to ceiling temperature profile achieved by an under-floor LTHRS is almost ideal for comfort. By contrast, the same profile for a conventional wall radiator system is inferior, with much heat carried by convection to upper levels of the living space. As a result, a LTHRS can deliver greater comfort at a lower temperature, with consequent energy savings estimated to be 2-5%.

The 'ideal' temperature profile of the heated space that is achievable with under-floor heating does not mean that heating embedded in the ceiling or wall is less preferable. For example, in many living spaces, the ceiling is the largest uncluttered surface and can, in principle, provide even radiant heating for the entire space. Radiant heating in the ceiling acts on the human body in the same way that the body is acted upon by radiant heat from the sky outdoors.

Types of LTHRS

Currently available LTHRS used in space heating fall into two groups:

Wet systems that involve burying heating pipes in some setting material: a wet screed, usually based on hydrates of calcium sulphate or calcium silicate. Wet systems are limited to floors and walls. In a typical installation on a ground floor, the floor is first covered with dense plastic foam insulation and the edges are sealed with an upright tape that serves as the containing rim for the poured setting material. Using a clipping or guiding system, one or more flexible plastic pipes made of cross-linked high-density polythene (PEX tube) are placed in a continuous serpentine on the insulation and then covered with the setting material. This method is widely used. If wet screed is used on upper floors, the additional structural loads involved must be dealt with. The thermal resistance of the screed helps to provide uniform heating across the floor but raises the water temperature required by several degrees C. compared with the best of the dry systems (see below). The thermal mass of the screed causes inefficiency of control.

Dry systems that carry and cover heating pipes using panels of solid material. Almost all modern dry systems use PEX tube arranged in a serpentine. Such systems can be used in floors, walls and ceilings. The most common installation in domestic living spaces is in the floor. In commercial living spaces, the LTHRS often employs pre-assembled panels suspended from the ceiling.

The main varieties of dry LTHRS for under-floor heating are:

Under-subfloor systems in which PEX tube is attached to the underside of a subfloor (which may be timber planks or particleboard or similar) and between joists. Aluminum plates or 'heat-spreaders' are attached to the pipes and insulation is attached under the pipes. Modular panels can also be fitted between the joists. The panel bears channels that grip the PEX tube. This method is convenient for adding radiant heating to an existing building but requires operation at relatively high temperatures to drive heat through the subfloor.

Floating floor systems in which PEX tube is attached to panels that sit on the existing subfloor. The panels are insulating, being made of engineered wood (plywood, strand board or particleboard) or dense foam polystyrene or similar. Again, the panels bear channels that grip the PEX tube and are of sufficient depth for further layers of floor to be directly laid on the panel. This type of LTHRS is suited both to new construction and to renovation.

Integrated systems in which the insulating panel also functions as the load-bearing subfloor.

Reducing the Temperature Drop in the Radiant Thermal Path

In order for the LTHRS to run at the lowest possible water temperature, the temperature drop from hot water to radiant surface must be as small as possible.

The main elements of the thermal path of a typical under-floor LTHRS are, in sequence:

Water
PEX tube wall
Heat spreader (usually aluminum plate or foil)
Subfloor
Screed
Floor underlay
Floor board or tile
Carpet or rug underlay
Carpet or rug Some of these elements may be absent. For example:

A heat-spreader may not be used if the tube is embedded in screed.
Subfloor is not on the thermal path if the heating tubes are installed above the subfloor.
Screed is used in wet systems and omitted in dry systems.
Carpets, rugs and associated underlays may not be present.

A similar, and simpler list can be constructed for a heating or cooling system that is placed in the wall or ceiling. This list may include plasterboard, for example.

The present invention is not directly concerned with the temperature drop across water, tube wall and the heat spreader adjacent to the tube.

The general equation for each of the remaining elements is:

$$F=QA \qquad 1.$$

$$Q=K \times \text{delta } T/W \qquad 2.$$

$$\text{delta } T=QW/K \text{ or } FW/KA \qquad 3.$$

where:
F=the total heat flow, watts
Q=heat flow rate, watts/m$^2$
A=area perpendicular to heat flow, m$^2$
K=thermal conductivity, watts/m ° C.
delta T=the temperature drop across the element, ° C.
W=the width of the element (length of thermal path), m In a space-heating application, F is the total heat flow required to compensate for heat loss, which is determined by the exterior insulation of the space and the difference between interior and exterior temperatures. A modern well-insulated home with double-glazing will have a peak annual heat loss rate of Q=50-60 watts/m$^2$ of floor area. A typical older home in a moderate climate (like the UK) has a peak annual heat loss rate of Q=70-90 watts/m$^2$. These are average figures. A room with a large window area and high ceilings may require Q=100 watts/m$^2$.

From equation 3, we can reduce delta T by:

Reducing F
This can be done by improving insulation. But all materials are thermally conductive, there are radiation losses from windows and there will be heat losses due to air exchange with the exterior.

Reducing W
There are limits to how far W can be reduced, usually because of mechanical properties (an element that is too thin will crack, leak, break or wear too quickly and so on). For example, the minimum recommended value of W for a wet screed over under-floor heating is around 30 mm. As another example, the minimum thickness of ceramic floor tile is around 5 mm (porcelain on a very stable underlay).

Increasing A
This can be done by extending the heated radiant area in the floor, walls or ceiling.
This extension is enabled by the present invention which permits standard cladding used in walls and ceilings to be used as radiant surfaces.

Increasing K

For example, granite or marble tile has a thermal conductivity up to 4× higher than standard ceramic tile and up to 20× higher than wood. Therefore, putting other criteria to one side, a sole objective of efficient under-floor radiant heating implies a preference for granite or marble floors.

In an example, a resilient and sound-absorbing flooring underlay may be made of a rubber compound. By selecting polyurethane rubber rather than natural rubber, K is doubled.

K can also be increased by using a composite material. For example, the conductivity of tiles can be increased by adding alumina. In a reported case, 20% by weight of alumina raised conductivity by 50%. A rubber/carbon composition with around 20% by weight of carbon powder is reported to improve conductivity three-fold.

Evans et al in EP0133631, filed in 1983, describe how the thermal conductivity of screed above under-floor heating pipes can be improved by using a combination of resin, fiber and sand.

However, the conductivity of such composites is always dominated by the least conductive constituent. As an example, the thermal conductivity of rubber with almost 90% by volume of aluminum powder is 100× less than the conductivity of the pure metal.

The effective value of K can also be increased by thermal bridging. This method overcomes the limitations just mentioned and can be applied with significant effect to most forms of interior cladding. It is the subject of the present invention and is discussed further below.

Thermal Bridging

Thermal bridging refers to the bypassing of an insulating layer by a heat-conducting element or thermal shunt. Conventionally, thermal bridging in building construction derives from an error in design or construction, leading to loss of heat from the building: it is to be avoided.

The present invention applies thermal bridging to any interior cladding that lies on the thermal path of a radiant heating or cooling system.

Thermal Bridging Defined

In the present invention, thermal bridging always involves three elements:
- The thermal shunt: one or more heat-conducting components that are aligned with the radiant thermal path and that penetrate the cladding.
- On the heat absorbing side of the cladding, a heat-collecting layer aligned with the cladding, with this layer thermally connected to the thermal shunt.
- On the heat emitting side of the cladding, a heat-dispersing layer aligned with the cladding, with this layer thermally connected to the thermal shunt.

Thermal Bridge Geometry

The ideal thermal shunt provides a thermal path through the cladding that is as short as possible ie it traverses the cladding at right angles to the plane of the cladding. It follows that the preferred geometry of a thermal bridge across cladding is rectangular.

The average thermal path through the entire thermal bridge should also be as short as possible. This means that a preferred configuration of thermal shunt is as a uniform array of elements that is perpendicular to the plane of the cladding, so spreading the thermal load on the heat-collecting layer and on the heat-dispersing layer.

Relative Levels of Thermal Conductivity

The material of a thermal bridge is always of higher conductivity than the material of the cladding.

The definition of high and low thermal conductivity is both absolute and relative. There is agreement that materials of low thermal conductivity—usually called insulators—include materials such as foam polyurethane, felt, cork and softwood. The thermal conductivities of these insulators are, respectively, $K=0.03, 0.04, 0.07$ and $0.12$ watts/m° C. There is also general agreement that materials of high thermal conductivity include metals such as stainless steel, iron, aluminum and copper, with thermal conductivities that are, respectively, $K=16, 55, 240$ and $400$ watts/m° C. It is evident that metals can be used for effective thermal bridges across cladding made of insulating material.

However there is also a range of materials used in cladding that have thermal conductivities with values that lie between the conductivities of obvious insulators and of metals. In such cases, and in general, it is useful to consider the ratio of the thermal conductivity of the bridge to the thermal conductivity of the cladding. As an example, standard tile porcelain ($K=1.3$ watts/m° C.) is ten times as conductive as most soft woods. Therefore, in principle, a relatively small volume of tile porcelain (say 10% of the volume of the wood) can significantly reduce the temperature drop across softwood for a given rate of heat transfer and so can be a practical material for a thermal bridge across softwood. However, standard tile porcelain is only five times as conductive as dense plasterboard ($K=0.24$ m° C.) and is therefore a questionable material for a thermal bridge across such cladding.

Cladding as defined here can be a multi-layer laminate. In general, each layer in such cladding has its own value of thermal conductivity. In this case, the thermal conductivity relevant to thermal bridging of the cladding is the effective conductivity across all layers.

The Need for Heat Collecting/Dispersing Layers

The need for heat-collecting and heat-dispersing layers in addition to thermal shunts is easily shown by considering a shunt comprising a material with relatively high thermal conductivity (say copper with $K=400$ watts/m° C.) traversing a thermally insulating cladding (say softwood with $K=0.12$ watts/m° C.). In this case, copper can conduct the same flow of heat over the same temperature drop as the softwood cladding with a cross-section that is only 100× $0.12/400=0.03\%$ of the cladding area. So for a given heat flow, such a thermal shunt can in principle halve the temperature drop across the cladding. But if the thermal shunt is perpendicular to the cladding surface this also means that only 0.03% of the cladding surface is highly conductive. As a result the average radiant thermal path is through the relatively insulating surface of the cladding and the average temperature drop across the cladding is hardly affected by the shunt.

Reducing Thermal Contact Resistance

Thermal contact resistance in any joins between the shunt and the heat-collecting layer and between the shunt and the heat-dispersing layer should be reduced to a minimum. Contact resistance is preferably eliminated by making the three elements of the thermal bridge—the thermal shunt, the heat-collecting layer and the heat-dispersing layer—out of the same continuous piece of material. Alternatively contact resistance can be kept to a minimum by constructing the thermal bridge from elements of the same malleable conductive material and forcing the three elements together so as to effectively bond together without gaps, preferably with a bonding agent.

Thermal contact resistance between abutting metal parts can be very high and is due to air gaps, which can be present at a microscopic level. Contact resistance is reduced by:

Exact fit of parts, for example, perfectly flat plate to perfectly flat plate.

Smooth surfaces.

High contact pressure. Experiments show that contact resistance between bare metal plates falls as contact pressure rises and falls to zero when cold welding pressure is reached.

A flowing filler or bonding agent: this fills the air gaps. To reduce resistance across the bond line, the bond line should be as thin as possible. For a given contact pressure, a filler can reduce contact resistance between flat metal plates by a factor of up to 20.

By bonding aluminum to aluminum under pressure, contact resistance can be reduced to the point that a thermal bridge so constructed may be considered to be effectively seamless.

Effect of Thermal Bridge on Temperature Drop

Assuming a complete thermal bridge with no or negligible contact resistance, the effect of the bridge on temperature drop across the cladding can be calculated as follows:

For parallel thermal resistances, in units of °C./watt:

$$1/R = 1/R_1 + 1/R_2 \qquad 4.$$

Where:
R is the combined resistance of cladding and thermal shunt
$R_1$ is the resistance of the cladding
$R_2$ is the resistance of the thermal shunt Obviously, for a given rate of heat transfer (watts), the temperature drop varies with R.

In the copper/softwood example given above, the reduction in temperature drop across the cladding for different cross-sections of thermal shunt as % of cladding planar area can be calculated:

0.03% area of thermal shunt results in $R_2 = R_1$ so that from 4: $1/R = 2/R_1$ or $R = R_1/2$ ie the temperature drop across the cladding is reduced by 50%

0.06% area of shunt results in $R_2 = R_1/2$ so that from 4: $1/R = 3/R_1$ ie the temperature drop across the cladding is reduced by 66%

0.12% area of shunt results in $R_2 = R_1/4$ so that from 4: $1/R = 5/R_1$ ie the temperature drop across the cladding is reduced by 80%

This is a striking result: small quantities (by volume) of highly conductive material can, in principle, significantly reduce the temperature drop across an insulator. However, these figures underestimate the quantity of heat-conducting material required because the volumes of the heat-collecting layer and the heat-dispersing layer are omitted. The temperature drop is also an overestimate because the temperature drop along the average thermal path through the heat-conducting layers on each side of the cladding is omitted.

The volume of these layers as a % of total cladding volume partly depends on the thickness of the cladding: the thicker the cladding the smaller this % becomes. The temperature drop along the average thermal path partly depends on the distance between adjacent elements of the thermal shunt.

In an example, the cladding is 20 mm thick, the layers on each side of the cladding are 0.1 mm thick (this is 10× thicker than standard kitchen aluminum foil). The volume of layers as a % of cladding volume is 100×2×0.01/20=1%. This figure must be added to the shunt % area figures given above.

In an example, the planar distance between uniformly distributed elements of the thermal shunt is 20 mm. The maximum distance travelled by heat dispersing to or from an element of the thermal shunt is 10 mm. The average distance is approximately 5 mm. If the thermal shunt and the heat collecting/dispersing layers are the same continuous material, then as an equivalent, approximately 5 mm of thermal path is added to each end of the shunt, increasing the resistance of the shunt in this case by (2×5)/20=50%.

The reduction in temperature drops across the cladding for different volumes of thermal bridge as % of total cladding volume becomes:

1.03% volume: 40%
1.06% volume: 57%
1.12% volume: 73%

In this example, the improvement in temperature drop is almost entirely due to increasing the cross-sectional area of the shunt.

Selecting Material for a Thermal Bridge

A suitable material for thermal bridging is aluminum of high purity (exceeding 99.6%). This is a soft metal with high thermal conductivity: around 230 watts/m° C. Most aluminum used commercially is in the form of a hard alloy. But typical hard aluminum alloys have thermal conductivities that are 20-40% lower than the pure metal. If thermal bridging does not require the metal to bear structural loads, the soft pure metal is to be preferred.

Other heat-conducting materials can also be used. Pure copper might seem to be suitable since it has a thermal conductivity that is 74% higher than pure aluminum. However, copper is both 3.3× denser than aluminum and also (in 2012) around 4× more expensive per kg. So the ratio of conductivity to cost per cc compared with aluminum is 1.74/(3.3×4)=0.13.

The same calculation can be made for cheaper metals. For example, standard carbon steel is half the price per kg of aluminum (in 2012). But it is 2.9× denser and has a thermal conductivity that is only 17% of aluminum. Therefore the ratio of conductivity to cost per cc compared with aluminum is 0.17/(2.9×0.5)=0.12.

Ceramics with high thermal conductivities such as aluminum nitride, boron nitride, silicon carbide and alumina have significantly lower conductivities than pure aluminum without being sufficiently cheaper. Porcelain is an option that is up to 20× cheaper than aluminum on a volume basis. However, in its standard form, porcelain has a thermal conductivity around 100× less than aluminum so that the ratio of conductivity to cost per cc compared with aluminum=0.2

The same calculation can be made for graphite. Depending on how this is processed it has widely varying properties. Lightweight expanded graphite has an in-plane thermal conductivity that is around 80% of pure aluminum. Its density relative to aluminum is 0.37 and the price per kg (in 2012) is around 8× higher. The ratio of conductivity to cost per cc compared with aluminum is 0.8/(0.37×8)=0.27.

Dense graphite sheet can have an in-plane thermal conductivity that is up to 2.6× that of pure aluminum. Its density relative to aluminum is 0.6 and the price per kg (in 2012) is around 10× higher. The ratio of conductivity to cost per cc compared with aluminum is 2.6/(0.6×10)=0.43.

Advanced graphite foils have in-plane thermal conductivities up to 1500 watts/m° C. or 6.5× the conductivity of pure aluminum. These foils, developed for cooling electronic components, are expensive.

It is possible that at some future date, carbon compounds will emerge that combine high thermal conductivity with low cost.

The cheapest heat-conducting constructional material is cement or concrete, which can be up to 30× cheaper than aluminum sheet on a volume basis. The thermal conductivity of these materials can be increased by formulations that reduce porosity and include conductive fillers. For example, inclusion of quartz sand can increase thermal conductivity of concrete up to K=3.5 watts/m° C. or 70× less conductive than aluminum. The ratio of conductivity to cost per cc compared with aluminum is 30/70=0.43.

Improving Emissivity of Aluminum

The thermal path of a radiant system may include radiant heat transfer between different layers of the system: for example between thermally bridged underlay and thermally bridged carpet. Untreated aluminum has very low emissivity, reflecting up to 97% of radiated heat. Aluminum surfaces engaged in radiant heat transfer in the thermal path of the radiant system should be treated to increase emissivity, for example by anodizing or by dyeing or by painting.

PRIOR ART

Wenger EP0089012, filed 1983. This is similar to DE3209091, filed 1983. An insulating panel has thermally conductive faces connected by thermal shunts that penetrate the panel. Two examples are given: conductive cylindrical sleeves inserted into holes in the panel and nails or screws penetrating the panel.

Comment

The combination of heat-collecting layer, heat-dispersing layer and thermal shunt meets the proposed definition of a thermal bridge given above. However this solution is flawed since it wastes material, weakens the panel and is likely to incur significant contact resistance between the shunts and the surface layers.

Wenger DE3511510, filed 1986. Wenger states that his earlier patent is deficient since it involves boring holes in the insulating panel and inserting relatively expensive metal shapes. He describes a composite panel, for example, particleboard, with upper and lower heat-conducting surfaces: these are thermally connected by conducting sheets that are inserted through an array of pairs of parallel slots cut in the panel. The sheets are folded over to connect thermally with the upper and lower heat-conducting surfaces.

Comment

This arrangement also qualifies as a thermal bridge. A sheet conductor as a thermal shunt is likely to be significantly cheaper than a shaped insert. However, milling the slots involves material wastage and can weaken the panel. There is still contact resistance between the shunt and the heat-conducting surfaces.

Wenger DE3710060, filed 1987. A composite insulating panel is constructed from elements wrapped at intervals with conductive sheet and bonded together so that the wrapped sheet is in thermal contact with upper and lower conductive surfaces.

Comment

This invention reproduces the 1983 invention but avoids the need for cutting slots by cutting an insulating panel into pieces and bonding such pieces together. The use of upper and lower conductive sheets is redundant and therefore an unnecessary cost, both in materials and in manufacturing complexity. There is also an avoidable thermal contact resistance between the upper and lower conductive surfaces and the wrapped sheet. The heat-transfer capacity of the thermal bridge is limited by the number and size of pieces of insulating panel that it is economical to cut up and by the effect on mechanical properties. There is wastage in cutting up the panel and additional expense in cutting it and bonding it back together.

Pirchl DE3211970, filed 1983. An insulating panel is penetrated by holes each containing an inserted sleeve made of, for example, resin, and inside each sleeve is a heat-conductive material, for example, a ceramic cement. The holes are given conical cross-sections, so that the heat-conducting material also provides a heat spreading and dispersing function. A manufacturing process is also described.

Comment

Pirchl's invention is similar to Wenger (DE3710060) but inferior. It is a less effective thermal bridge because the heat spreader and diffuser cover only a small fraction of the panel surface: otherwise an amount of original panel would have to be removed that would be a large waste of material and would significantly change the physical properties of the panel, including its load-bearing capability. Also most ceramics are significantly poorer thermal conductors than most metals.

Pruefling DE2509841, filed 1975. Pruefling describes an underfloor heating system with fast thermal response. A heat-conducting layer is shaped into uniform castellations, with the heated conduit fitted between the castellations. The castellated layer, made for example, of thin steel, has a backing of rigid foamed plastic insulation. Flooring material, for example, carpet, is placed directly on the castellated surface; the conduit is protected from foot traffic by inserts made, for example, of wood fiber.

Comment

This is not a thermal bridge across an insulating panel; it is an example of a heat spreader that has channels for holding the heating conduit. There are many examples of heat-spreaders without thermal shunts: for example Fiedrich US59311381, Chu1 US2012/0301727, Asmussen US2013/0099013

Pruefling DE2535522, filed 1975: The castellated underfloor heating system of DE2553522 is further described. In one version (FIG. 3), dry screed above the heating circuit is penetrated by a corrugated conductive layer.

Comment

The conductive layer is described as an embossed continuous sheet. This may be suitable for in situ poured flooring where the 'valleys' on the upper side of the embossed sheet can be simply filled with screed. But where an insulating panel is pre-manufactured it is a significant advantage for a thermal bridge to have an open structure that enables the material of the panel (for example, plaster or wood composite) to form a coherent connected mass without weakening voids.

Hahn DE2621938, filed 1977 and Hahn DE2538830/FR2322248, filed 1977.

Heat transfer across an insulating material such as screed is improved by incorporating conducting powders, granules, grids and preformed inserts.

Comment

Hahn describes varying the density of particles across the screed.

He also describes an embedded zig-zag thermally-conductive grid but provides little description. The zig-zag shape shown is not an ideal thermal shunt because it does not provide the shortest thermal path across the insulator. This is not a thermal bridge because there is no heat-collecting layer or heat-dispersing layer connected to the shunt.

Senden NL1034848, filed 2007. An insulating construction panel includes heat conducting material that conducts heat through the panel. In a first example, fins of conductive material radiate through the panel from a heated conduit on the rear surface of the panel.

Comment

This does not provide uniform heating to the front of the panel. It does not constitute a complete thermal bridge.

In a second example, fins of conductive material connect to heat conducting surfaces on the back and front of an insulating panel.

Comment

This is a complete thermal bridge. The construction of the fins is not explained nor is the connection of shunt and surface layers explained In a third example, a composite heating panel is described, comprising a back panel of rigid polystyrene foam; next to this, a layer of aluminum, incorporating a channel carrying a heated conduit; next to this a second layer of rigid foam; next to this a second layer of aluminum; next to this a front panel of plaster. Conductive sheet is wrapped round blocks of the second layer of foam, so providing a thermal shunt.

Comment

This is a complete thermal bridge across the rigid foam and appears similar to the description in Wenger's last patent (DE3710060). The second aluminum layer is unnecessary and entails unnecessary contact resistance. With a suitable arrangement of the heat source, the first aluminum layer is also unnecessary. The inventor's claims are specific to a thermal bridge across low-density materials with very low thermal conductivity, such as plastic foam. In this third example, the insulating plaster front panel has no thermal bridge.

Li US 20100313504, filed 2009. Li describes a heated flooring system comprising wooden boards connected by thermally conductive members. Each member comprises a hollow lower section that conducts heat transfer fluid and an upper solid section that locks together adjacent boards and provides a thermal path to the upper surface.

Comment

This is a poor thermal bridge. The thermal shunt is effective but the upper heat-dispersing surface covers only a small fraction of the floor surface. As a result the heating from the radiant surface is uneven.

In summary, although relevant invention dates to at least 1974 (Bosch, DE7408063), prior art does not describe radiant thermal bridges for interior cladding that are sufficiently efficient, cost-effective and manufacturable.

Advantages

The present invention significantly improves on prior art by:
- Reducing the temperature drop across common forms of cladding using thermal bridges of high efficiency and low cost.
- Doing so with minimal material wastage.
- Doing so with minor modifications to the standard manufacturing and installation processes for such cladding.
- Doing so without significantly compromising the desired properties of the cladding: for example, strength.

SUMMARY OF INVENTION

A rigid or pliable interior cladding for the floor, wall or ceiling of a domestic or commercial living space that is part of the thermal path of a radiant heating or cooling system is constructed with thermal bridges: using material of higher thermal conductivity to bypass the thermal resistance of material of lower thermal conductivity.

The present invention describes the construction of thermal bridges that:
- Use the shortest possible thermal shunts ie shunts that are substantially at right angles to the plane of the cladding.
- Use heat-collecting layers and heat-dispersing layers that are parallel to the cladding surface and on the surface and preferably covering most of the surface.
- As a consequence of 2 and 3, use thermal bridges of substantially rectangular shape.
- Use continuous, seamless material for shunt and heat-conducting layers so that contact resistance in the bridges is nil. Otherwise, contacting elements of the bridge are pressed together and bonded in place under significant pressure, where this means at least 50 psi and preferably over 500 psi.
- Are arranged in a uniform planar array.
- Are installed in cladding preferably as an integral part of the standard cladding manufacturing process.
- Have an open structure, meaning a geometry that allows moldable material to flow through a uniform arrangement of gaps in the bridges and so to form a uniform coherent mass that protects the structural integrity of the cladding.
- Use primarily aluminum for the material of the thermal bridges.

Corresponding adaptations of standard cladding manufacturing processes are also described.

The appropriate embodiment of thermal bridging varies with the size of the cladding element, the manufacturing process and the rigidity of the element. For example, plasterboard is a rigid cladding in the form of relatively large panels, constructed by molding. Composite wood panels such as fiberboard and particleboard are molded under high pressure. Timber flooring is an example of rigid cladding in the form of relatively small units (planks) constructed by dividing up larger pieces of material. Carpet underlay is an example of flexible cladding made in large continuous sheets. These claddings are addressed by embodiments of the present invention. In each case the aim is to make the incorporation of a thermal bridge into the cladding an easy adaptation of current manufacturing processes.

The described embodiments of thermal bridge are:
Honeycomb shunt
Rectangular spirals
Rectangular loops or rolls
Rectangular corrugated mesh
Rectangular loop pressed sheet
Flapped pressed sheet
Arrays of L-shaped flaps
Embedded cuboids
Wrapped sections
Embedded wrapped cuboids
Deformed spirals
Penetrating pressed sheet
Molded bridges
Folded conductive thread loops
Conductive granules Plasterboard Plasterboard is a common interior cladding for walls and ceilings. It is available in a wide variety of special forms: for example, to resist fire, suppress vibration, block moisture and resist impact. Where a radiant heating or cooling system is operating through a wall or ceiling, plasterboard is an option as a radiant surface.

Advantages

The advantages of using plasterboard as the radiant surface are:

The radiant surface can be large

The radiant surface can be inconspicuous

It is a constructional panel that is well-understood and well-accepted.

It is mass-produced and therefore cost-effective; the methods describe here require only minor changes to the manufacturing process It is easy to install It allows a wide choice of decorative finishes The methods described here allow normal treatment of the panel such as sawing, nailing, installing electric cabling, hanging pictures and so on.

Properties

Plasterboard is used in a range of densities and thicknesses. Common thicknesses for walls are 9.5 mm and 12.5 mm. For wide spans on ceilings, 15 mm may be preferred. For sound suppression and fire resistance, the thickness may be up to 25 mm. The thermal conductivity of standard plasterboard is around 0.18 watts/m° C., rising to 0.25 watts/m° C. for high-density board.

Temperature Drop

From equation 3, the temperature drop across standard 12.5 mm plasterboard for Q=50 to 100 watts/m² is:

delta $T=(50\text{-}100) \times 0.0125/0.18 = 3.5°$ C. to $7°$ C.

This temperature drop makes conventional plasterboard a poor choice for radiant heat transfer.

Small quantities of aluminum used as a thermal bridge can significantly increase the thermal conductance of plasterboard. For example, high-purity aluminum has a thermal conductivity that is 1280× higher than standard plasterboard. So $\frac{1}{1280}$ (=0.08%) by volume of aluminum embedded in a given area of plasterboard could, if combined with heat collecting/dispersing layers, double the rate of heat transfer for a given temperature drop or halve the temperature drop for a given rate of heat transfer. This is possible in principle if an embedded aluminum shunt is used in the form of straight fibers, pins or walls, bridging the board at right angles to the plane of the board and uniformly distributed.

Honeycomb

In an embodiment of the present invention, a uniform density of perpendicular thermal shunts is achieved by embedding high-purity aluminum honeycomb inside the plasterboard, with the thickness of the honeycomb panel equal to the thickness of the plasterboard panel. Aluminum honeycomb is an affordable solution since it is mass-produced by a simple process from bonded foil, mainly for constructing strong but light composite panels. To improve rigidity, the foil is usually an alloy. Adhesion between the foil and the plaster can be improved by treating the surface of the foil, for example, by abrasion, by anodizing or by phosphating and by adding adhesive polymer to the plaster. Perforations in the foil used to construct the honeycomb allow mechanical bridging of plaster between honeycomb cells.

Aluminum sheet laminated to each side of the panel is bonded to the honeycomb under pressure. If the aluminum sheet is 0.05 mm thick, say, then, for a 12.5 mm plasterboard these constitute an additional 0.1/12.5=0.8% by volume of the total board.

Trial

In a trial, commercial honeycomb made of 0.07 mm aluminum alloy foil was embedded in plaster and 0.05 mm high-purity aluminum foil was bonded to each side of the honeycomb using epoxy cement. The honeycomb was 2.4% by weight of the plaster/honeycomb composite, equivalent to 0.6% by volume. The block of plaster/honeycomb composite and an identical block also with facing foil but without the honeycomb were placed on the same heated plate. The heated plate was 5 mm aluminum over a serpentine of constant output resistance wire. The samples were fixed to the plate using mastic and the temperatures were measured using K thermocouples in mastic.

The temperature drop across the plaster/honeycomb composite was around 70% less than the temperature drop across the same thickness of plaster alone (ie the effective conductivity of the plaster was increased by a factor of 3×).

Manufacture

Plasterboard is manufactured by grinding and calcining gypsum, mixing the powder with fibers of wood, paper or glass and other additives, adding water, extruding a layer of wet plaster paste on to a lower layer of paper, feeding through rollers with an upper layer of paper, slicing into panels and drying the panels.

A minor modification of this manufacturing process allows aluminum honeycomb to be embedded in the plaster. The lower and upper layers of paper are replaced or supplemented by flexible heat-conducting materials that act as heat-collector and heat-diffuser. To enable drying of the wet plaster, the material must also be permeable to moisture. In an embodiment, the lower and upper layers are fine paper laminated with inner surfaces of perforated aluminum foil. Metallized or graphitized paper or fabric can also be used. The moving lower layer of perforated aluminum foil is coated with adhesive. Honeycomb panels are fixed to the foil. Wet plaster is poured over the honeycomb. Vibration ensures that the plaster paste fills the honeycomb without voids. The upper layer of perforated foil is also coated with adhesive and is pressed on the top of the honeycomb.

Rectangular Spirals

In another embodiment of the present invention, rectangular spirals of aluminum wire or strip are embedded side by side in plaster, with the depth of the spirals equal to the thickness of the finished plasterboard.

The portions of the spiral that span the depth of the plaster serve as a thermal shunt; the outer edges of the spiral serve as heat-collecting and heat-dispersing layers. The thermal shunt is most effective when it is perpendicular to the faces of the plasterboard and heat collecting/dispersing layers are most effective when parallel to the faces of the plasterboard. Therefore the most suitable geometry is rectangular.

Rectangular Loops or Rolls

In another embodiment, rectangular loops of aluminum wire or strip are constructed by weaving. In effect, the coils of a spiral are displaced at right angles to the spiral axis so that the spiral loops are edge to edge. A parallel series of such loops can be held in place by wires woven at right angles to the loops. In this manner, a linked planar array of rectangular loops is constructed. Alternatively, the rectangular spirals can be replaced by rectangular rolls made of sheets of woven wire or tape or by sheets of expanded mesh or by perforated sheets.

Rectangular Corrugated Mesh

In another embodiment of the present invention, a roll of flat aluminum mesh is fed into crimping rollers to produce a corrugated mesh with a depth of corrugation equal to the thickness of the finished plasterboard. The corrugated mesh is fed on to the lower layer of paper. The wet plaster paste flows through the mesh and the manufacturing process is completed as already described.

The walls of the corrugation serve as a thermal shunt and the extremes of the corrugation serve as heat-collecting and heat-dispersing layers. The corrugation can be most effective as a thermal shunt when the wall of the corrugation is perpendicular to the plasterboard. It can be most effective in heat-collection and heat-dispersion when the extremes of the corrugation are aligned with the plasterboard surfaces. These conditions are met by a rectangular corrugation.

Mesh and Expanded Mesh

A mesh means any material in the form of a sheet covered in a dense uniform array of apertures. A mesh may be made by weaving wire, strip or fiber (there are multiple weave patterns), by twisting wire, by welding wire, by perforation of sheet or by slitting and expanding sheet.

In its most common form, expanded mesh is made by slitting metal sheet to create a pattern of staggered parallel slits. By stretching the sheet at right angles to the slits, a uniform lattice is formed, comprising curved strands surrounding rhomboidal apertures. The curved strands alternately curve above and below the plane of the mesh. This is called a raised expanded mesh. If this raised mesh is used directly to make a corrugated thermal bridge, the thermal path through the shunt follows the curves of the strands. This thermal path can be made significantly shorter, improving heat transfer, by flattening the mesh, for example by passing the mesh through rollers. Manufacture of such mesh is simple and low cost with negligible material wastage.

Raised Mesh

A raised expanded mesh can be incorporated directly in a molded panel to form a thermal bridge. The thickness of such raised mesh varies with the length of the slits made before expansion. As an example, a raised aluminum mesh is made with the same thickness as finished plasterboard. The mesh is placed on a paper layer and wet plaster is poured on to the mesh. Due to the open structure of the mesh, plaster fills all the voids between the metal. Manufacture of the plasterboard then continues in the normal way.

Rectangular Loop Pressed Sheet

In an embodiment of the current invention, rectangular loops are pressed from aluminum sheet. Aluminum sheet is slit into a uniform array of pairs of slits. The sheet between each pair of slits is pressed at right angles to the plane of the sheet so that this portion of sheet is drawn into an open rectangular loop, forming a planar array of rectangular loops seamlessly connected to a planar base. The height of the loops is the same as the thickness of the finished plasterboard. The manufacturing process for this looped pressed sheet is simple and material wastage is insignificant.

The looped pressed sheet is placed on the plasterboard platform with the loops facing upwards and wet plaster paste is poured around the loops, flowing through the loops, until the top surface of the loops is aligned with the top surface of the wet plaster. The plasterboard manufacturing process is then completed.

The result is a uniform array of seamless rectangular thermal bridges through the panel.

If the loops are stretch-formed, then the geometry of the loops is limited by the maximum practical elongation of the aluminum alloy used. This can be up to 25%. The length of a rectangular loop is the length of the pair of slits plus 2× the thickness of the panel. If, for example, the panel is 12 mm thick, then the required length of the slits, L, is given by: 24/L=0.25 or L=at least 96 mm Flapped Pressed Sheet In an embodiment of the current invention, rectangular flaps are pressed from aluminum sheet. Aluminum sheet is slit into a uniform array of pairs of slits and each pair of slits is joined at one end by a cut at right angles to the slits. The result is a cut in a rectangular U-shape. The sheet between each pair of slits is pressed at right angles to the plane of the sheet so that this portion of sheet becomes a vertical flap, so forming a planar array of vertical flaps seamlessly connected to a planar base. The height of the flaps exceeds the thickness of the finished plasterboard. The manufacturing process for this flapped pressed sheet is simple and material wastage is insignificant.

The flapped pressed sheet is placed on the plasterboard platform with the flaps facing upwards and wet plaster paste is poured around the flaps until the required thickness of paste is achieved. At this point the flaps project vertically from the surface of the paste.

By moving the paste layer under a roller, the exposed vertical section of each flap is bent over and flattened against the upper surface of plaster. The result is an array of rectangular thermal bridges (each rectangle is of course missing one side). Depending on the orientation of the flapped pressed sheet relative to the roller, each flap and its connecting base sheet forms either a rectangular C-shape or a rectangular S-shape. The plasterboard manufacturing process is then completed.

As an alternative, the exposed sections of each flap are not bent over until the plaster has set. In this case a more rectangular profile may be achieved, but an adhesive layer must be added to the flaps so that the flaps can be laminated to the surface of the dry plaster.

The result is a uniform array of seamless rectangular thermal bridges through the panel.

L Shaped Strips

In an embodiment that closely resembles the use of flapped pressed sheet, L-shaped strips of aluminum mesh or of aluminum sheet or of perforated aluminum sheet are bonded in a uniform array to the lower layer of plasterboard paper before the plaster paste is added. The upright portions of the L-shaped strips are equivalent to the flaps described in the last section.

Embedded Cuboids

In another embodiment of the present invention, heat-conducting elements with a diameter equal to the thickness of the plasterboard are dispersed in the wet paste.

Suitable shapes for such an element have open geometries, allowing bridging of plaster across the metal/plaster matrix. Again a rectangular profile is desirable so that a complete thermal bridge is constructed out of continuous heat-conducting material. This can be achieved with, for example, a wire cuboid or a cuboid cylinder. If the cylinder has a square cross-section and is elongate and is wrapped round its circumference with heat-conducting sheet, it will automatically orient itself on a flat platform so that the sheet provides a rectangular thermal path. Shapes can be constructed so that they have asymmetric density (for example, by wrapping a cylinder in 1.5 rotations). These shapes will orient themselves uniformly if vibrated on a tray. To avoid air bubbles inside the shapes, they can be pre-filled with plaster before the main manufacturing process. Spherical heat-conducting shapes can provide a short thermal path regardless of orientation. Possible alternative shapes include a spiral with spherical outline, or a sphere made of wire hoops, or a wire cube or a wire tetrahedron.

The result is a dispersed array of approximately rectangular seamless thermal bridges.

Wrapped Sections

In another embodiment, the thermal shunt is added after a plasterboard panel has been made, by wrapping segments of the panel in a heat-conducting layer.

A heat-conducting layer is wrapped round the edges of the panel and laminated to each side of the panel. In this way, the three elements of the thermal bridge are made out of a continuous piece of material. Standard plasterboard panels are too wide at 0.6 to 1.35 m to be effectively bridged by thermal shunts on the edges of the panel alone. In an embodiment of the present invention this problem is solved by:

- Cutting the panel into narrower sections or making narrower sections
- Wrapping heat-conducting foil round each section and bonding the foil to the plaster
- Bonding the sections back together.

In a related embodiment, narrow sections of finished plaster are wrapped in heat-conducting foil and these segments are fed back into the plasterboard manufacturing process. If the foil is spiral or perforated, there is a mechanical bridge between old and new plaster. This is equivalent to the method of embedded pre-filled cuboids described in the previous section.

Other Molded Cladding

Plasterboard is an example of a cladding produced by molding. The methods described for thermal bridging of plasterboard are applicable to other similar molded cladding: for example, products containing:

- Clay, cement or other minerals
- Wood, bamboo, paper, straw, wool or other natural fibers
- Rubber or other elastomers
- Plastics Screed A significant number of radiant heating systems consist of under-floor tubing carrying hot water, with the tubing embedded in a so-called wet screed that is mixed and applied in situ and allowed to set. Wet screed is a setting layer like plasterboard and the thermal bridges applicable to plasterboard are also applicable to screed.

Wet Screed

Wet screed is usually based on hydrates of calcium sulphate or calcium silicate and typically when set has a thermal conductivity of around $K=1.1$ watts/m° C. The required depth of screed over the pipes depends on the screed composition—for example, the inclusion of reinforcing fibers—and is between 30 and 40 mm.

Temperature Drop for Wet Screed

From equation 3: the temperature drop across 40 mm screed for $Q=50$ to 100 watts/m$^2$ is:

$$\text{delta } T = (50\text{-}100) \times 0.040/1.1 = 2° \text{ C. to } 4° \text{ C. approximately}$$

By using thermal bridging as described here, this temperature drop can be significantly reduced at low cost.

Rectangular Spirals

As an example, before pouring the screed, rectangular spirals of aluminum are laid across the heating tubes in a uniform pattern at right angles to the tubes. The spirals have a height equal to the desired depth of screed above the tubes. The spirals can be held in place temporarily by gravity, for example by dense rods arranged inside the spirals. The spirals can also be held in place temporarily by using dabs of tacky adhesive placed on each end of a spiral where it contacts the tubing. Wet screed is then poured over and into the spirals, so that when the screed layer is complete, the upper surface of the spirals is continuous with the upper surface of the screed. The result is a uniform array of seamless rectangular thermal bridges across the screed.

The spirals can be pre-filled with set screed. The spirals can be substituted by rectangular cylinders of flat aluminum mesh. The spirals can also be substituted by an aluminum mesh that is folded into a planar rectangular corrugation. A suitable mesh is made by flattening expanded aluminum.

Dry Screed

Wet screed can be substituted by dry screed floor panels. These resemble plasterboard but are load-bearing and so, typically, are reinforced with fibers and used at thicknesses of 30-40 mm. The dry screed panels typically have tongue and groove edges. Commercial dry screed panels have a thermal conductivity of $K=0.44$ watts/m° C.

Temperature Drop for Dry Screed

From equation 3, the temperature drop across a 40 mm panel for $Q=50$ to 100 watts/m$^2$ is:

$$\text{delta } T = (50\text{-}100) \times 0.040/1.1 \ 0.44 = 4.5° \text{ C. to } 9° \text{ C. approximately}$$

Dry screed panels can be thermally bridged in the same way as plasterboard.

Molded Cladding with Compression

Plasterboard is an example of a molded, setting cladding that does not require compression during manufacture. Other forms of molded cladding, including wood composite (or engineered wood) panels—for example, medium-density and high-density fiberboard (MDF and HDF), particleboard and oriented strand board (OSB)—involve compression.

Wood Composite Manufacturing

The above-named wood composite claddings have similar manufacturing processes: wood particles or pieces are cut, sieved, dried, combined with resin, formed into a mat on a forming line, which can be a horizontal plate or belt, and compressed in a hot press at a temperature of 150-250° C. and a pressure of 200 to 1000 psi. The hot press may be preceded by a cold press that expels air from the mat. The hot press may also be preceded by a pre-heater that accelerates the press cycle. For special applications, other materials may be added to the wood particles: for example, to protect against water, fungal attack, insects and fire. A primary difference between these wood composite products is in wood particle geometry.

Wood particles for MDF and HDF are fine wood fibers generally with a length from 1 to 5 mm and a diameter of under 0.1 mm. Such fine particles compress into a dense uniform board that is easily machined. It is widely used for interior furniture and doors. It is also used in cladding for walls and ceilings, usually covered with a veneer. It can be molded to form shaped skirtings, architraves and window boards and for decorative effect. It is also used as core material in laminate flooring.

Wood particles used in particleboard are typically much larger than used in MDF and HDF, with length in the range 2 to 15 mm and a diameter of 0.2 to 1.2 mm. The mechanical and decorative properties of the panel are improved by a density gradient across the panel, with finer particles in the outer layers. Finer particles can be separated by blowing or sieving. An array of rotating discs may also be used to orient the coarser wood material. Particleboard is less dense than fiberboard. It has similar uses. For example, faced with melamine it is used for furniture. It is also widely used for subfloor and roofing.

An OSB panel consists of mats of wood flakes (or strands) that are much larger than the particles in particleboard. Strands are cut to controlled dimensions—usually up to 150 mm long and 25 mm wide—from debarked small diameter logs. The strands are sifted and dried, treated with resin and conveyed to a forming line. Usually an OSB panel has three layers: outer layers sharing a common orientation of the grain in the strands and an inner core layer in which the grain of the strands is generally at right angles to the grain in the outer layers. The three layers are hot-pressed together.

OSB is stronger than particleboard and is a cheaper substitute for plywood. It is used in load-bearing applications, for example as subfloor or as components of bracing and I-beams.

Inserting Thermal Bridges During Manufacture

In all these instances of wood composite cladding, a description is given here of thermal bridges inserted during manufacture using minor variations of standard manufacturing processes. The advantages gained include low cost and low material wastage. By using thermal bridges with an open geometry, the wood composite retains its coherent structure and the mechanical properties of the cladding are not significantly compromised.

Where aluminum thermal bridges are embedded in wood composite panel, the panel containing aluminum thermal bridges can be sawed and nailed and machined in a normal fashion.

Bridges Effect on Productivity, Quality

Thermal bridges inserted during manufacture of wood composite can improve the productivity of the fiberboard production line because the improved heat transfer to the middle of the compressed mat speeds up the resin hardening. Product quality can also be improved using thermal bridges because faster, more even heating provides a more uniform product. Slow pressing times for thicker panels—up to 10 minutes per batch for panels over 12 mm—are considered to be a problem in the molded panel industry. See, for example, comments in US 20130048190 (Gupta et al).

Because the thermal bridge is incorporated before compression and resin hardening, it forms part of a coherent mass and so avoids significantly compromising the mechanical properties of the panel so made.

Protecting the Press

In molded wood production lines, metal detectors and magnets are used to find and remove any metal accidentally included in the formed mat. Therefore any metal thermal bridges incorporated in the mat should be added after unwanted metal has been detected and removed. The purpose of metal removal is to prevent damage to the moving parts of the line and especially to the presses. The thermal bridges used must be primarily of relatively soft material, such as aluminum, to avoid such damage. As additional protection, a replaceable shield layer, for example, a sheet of hardened steel, can be placed on the forming platform and/or on top of the mat. Where protection is required for a woven belt in a cold press, the shield layer can be perforated to allow removal of air in the mat, for example using a fine, flexible steel mesh.

Effect of Compression

In the above-mentioned products, the mat is compressed by a ratio of 5-10× in the hot press. As a result, any thermal bridge placed in the mat before pressing may be subject to significant deformation. The deforming behavior will vary by type of product. In the case of fiberboard, the homogenous mass of fine fibers can flow round the thermal bridge. Consequently, it is possible to insert into the fiber mat thermal bridges that have dimensions fitting the final thickness of the panel and to compress the mat without significant crushing of the bridges. In the case of particleboard and OSB, the non-homogenous arrangement of larger particles impedes penetration of the mat by the thermal bridge. One solution to this problem is to insert an over-sized thermal bridge into the mat and to allow this to be crushed by pressing.

Penetrating Thermal Bridge

Another solution is a penetrating thermal bridge. The compressive force of the cold or hot press can be exploited to create a substantially rectilinear thermal shunt in compressively molded cladding by placing suitable heat-conducting shapes in and on the mat. When compressed, these shapes penetrate the mat, are forced into intimate contact with each other, and are fixed in position by curing a binding agent. Bonding under pressure can greatly reduce contact resistance. Suitable shapes can be arranged to create a uniform array of substantively rectangular, effectively seamless thermal bridges.

Aluminum Adhesion

In all these instances, where aluminum is used for the thermal bridges, the embedded thermal bridges preferably constitute an open structure, permitting formation of a coherent mass of cured wood composite. This is because binding agents commonly used in wood composites—for example, urea formaldehyde resin—do not provide a wood-metal bond that is as strong as a wood-wood bond. To improve wood-metal adhesion, the resin can be modified (suitable commercial products are available) and the surface of the aluminum can be treated for example, by anodizing or with phosphonic acid, and pre-coated with resin. Suitable heat-cured adhesives for aluminum include single component epoxies and polyurethane glues: these can be used as the binding agent for the wood composite.

Fiberboard

The advantages listed above for plasterboard as a radiant surface also apply to fiberboard. Fiberboard is widely used as a layer in laminate flooring and is also used, usually as a laminate, in wall and ceiling panels.

Fiberboard is available in a range of thicknesses: from 2 mm (⅛ inch) to 60 mm (1⅜ inch). 12 mm is a typical thickness for decorative cladding.

The thermal conductivity of fiberboard varies with density, varying from 0.10 watts/m° C. (MDF) to 0.14 watts/m° C. (HDF).

Temperature Drop

From equation 3, the temperature drop for 12 mm MDF cladding used for radiant heating or cooling, for Q=50 to 100 watts/m² is:

delta $T$=(50-100)×0.012/0.10=6° C. to 12° C.

This is a large temperature drop, making the use of MDF panels without thermal bridging inefficient as radiant panels.

High-purity aluminum is up to 2300× more thermally conductive than fiberboard so that, in principle 0.05% by volume of high-purity aluminum used as a thermal shunt can cut the temperature drop across the board by 50%. If the heat-collecting/dispersing layers on each side of the board are 0.05 mm thick, then, for a 12 mm board these constitute an additional 0.1/12=0.8% by volume of the total board. So less than 1% by volume of aluminum can, in principle, halve the temperature drop across a 12 mm panel of fiberboard A thermal bridge can be constructed in fiberboard using the methods already described for plasterboard:
  Honeycomb shunt
  Rectangular spirals
  Rectangular loops and rolls
  Rectangular corrugated mesh
  Rectangular loop pressed sheet
  Flapped pressed sheet
  Embedded cuboids
  Wrapped sections Honeycomb As an example, in an embodiment of the present invention, a sheet of aluminum honeycomb having a height equal to the thickness of the finished fiberboard panel is bonded to a flat aluminum sheet that rests on the forming platform. Fine resinated wood fibers are poured over the honeycomb until the full height of the mat is reached. Then the mat is covered by a second flat aluminum sheet that carries a curable adhesive layer. During hot pressing, the honeycomb is forced into intimate contact with the upper flat aluminum sheet and is bonded in place, so that thermal contact resistance is low. The result is a uniform array of effectively seamless rectangular thermal bridges across the panel.

To avoid shear forces on the honeycomb, any pre-pressing is preferably carried out with a vertically operating press.

Rectangular Spirals

As an example, a uniform planar array of spirals of aluminum wire is placed on the forming platform. The axes of the spirals are aligned with one of the sides of the panel being produced. The spirals are rectangular in cross-section with a height equal to the thickness of the final panel. One face of the rectangular spirals is against and parallel to the forming platform. Fine wood fibers are poured on to the spirals, flowing between and over the spiral coils. After hot pressing, portions of the spiral wire are on the two surfaces of the panel and parallel to the plane of the panel. These portions of the spirals act as heat-collecting and heat-diffusing surfaces. This surface wire is joined seamlessly by wire that is straight and perpendicular to the mat, acting as a thermal shunt. The result is a uniform array of rectangular and seamless thermal bridges across the panel.

The spirals can be made crush-resistant by selecting a strong aluminum alloy and by increasing the wire diameter. The wire can also be flattened vertically to align with the motion of the press.

Spirals can be substituted by woven rectangular loops or by rectangular rolls of mesh.

Rectangular Corrugated Mesh

Mesh with rectangular corrugations can be made crush-resistant. A sheet of such corrugated mesh made with a height equal to the thickness of the finished panel can be embedded in the pre-press mat. On pressing, the fine fibers flow through the apertures of the mesh and the mesh does not deform. On hot pressing, the mesh is fixed in place by curing of the binding agent, resulting in a uniform array of seamless rectangular thermal bridges across the panel.

Rectangular Loop Pressed Sheet

A sheet with pressed rectangular loops can be made crush-resistant, for example, by twisting the loops so that the loops have edges aligned with the motion of the press. A sheet of such loops made with a height equal to the thickness of the finished panel can be embedded in the pre-press mat. On pressing, the fine fibers flow round the loops and the loops do not deform. On hot pressing, the loops are fixed in place by curing of the binding agent, resulting in a uniform array of seamless rectangular thermal bridges across the panel.

Embedded Cuboids

Dispersed heat-conducting shapes can be made crush-resistant by, for example, pre-filling such shapes. For example, fiberboard can be pressed in the form of fiberboard rods with a square cross-section. Aluminum sheet is wrapped round the rods, for example, in a continuous spiral and bonded to the rods. The rod is cut into sections, forming elongated cuboids wrapped in aluminum, the wrapped cuboids having a height that equals the thickness of the finished panel. The wrapped cuboids are arranged in a uniform planar array on the forming platform or simply dispersed uniformly on the forming platform, noting that elongated cuboids are self-righting. Fibers are poured on to the cuboids and, on pressing, flow round them. On hot pressing, the cuboids are fixed in place by curing of the binding agent, resulting in a uniform or dispersed array of seamless rectangular thermal bridges across the panel.

If, for example, the cuboids are uniformly spaced so as to occupy 50% of the area of the forming platform, then the resulting panel will also be 50% cuboids by volume and the volume of mat required will be 50% of the volume required without cuboids. Varying the percentage of cuboids changes the thermal and mechanical properties of the panel.

Pre-filled cuboids can be filled with conductive material. For example, conductive porcelain can be pressed and fired in the form of cuboids that are then wrapped with aluminum sheet.

In all these instances of crush-resistant thermal bridges, the fibers must be able to flow round the bridges during pressing. This flow can be improved by adding lubricants in the pre-press mat: for example, by suspending the wood particles in water as is done in the so-called wet-manufacturing process used for making fiberboard. This wet process is similar to the dry process, except that the pre-press mat is drained before hot pressing.

Deformed Spirals

Instead of using crush-resisting thermal bridges, the elements of the thermal bridge can be deliberately deformed. As an example and as an alternative embodiment of the present invention, a uniform array of aluminum spirals is placed on the forming platform. The spirals are circular in cross-section and have a diameter exceeding the final thickness of the panel. Fibers are poured into and over the spirals to from a mat. Hot-pressing deforms the circular spirals into flat ovoid spirals that bridge the final panel. The initial spacing of circular spirals on the forming platform determines the gaps between flat ovoid spirals in the final panel. The spacing can be selected so that the ovoid spirals are separated or abut each other or intersect.

The spirals described above can be made of aluminum strip. Spirals can be substituted by rolls that are constructed of folded perforated sheet or folded woven aluminum wire or strip or folded expanded aluminum mesh.

If hot-pressing increases the density of the pre-press mat by a factor of 10×, then the horizontal length of a flat ovoid spiral, assuming no stretching of the spiral material, is $\pi R^2/10\, t$ where R is the radius of the spiral and t is the intended thickness of the panel. If, for example, t is 12 mm and R is 60 mm—easily large enough to accommodate wood strands up to 50 mm wide—then the length of the ovoid is 94 mm. Therefore, in principle, a forming platform that is say, 2440 mm (8 feet) wide can be loaded with an aligned array of filled circular spirals, with the number of such spirals being 2440/94=26. With this number of spirals, the spacing between circular spirals is such that the resulting ovoid spirals abut each other and, with ideal spacing of the spirals, the ovoid spirals press together to form substantively rectangular spirals. With wider spacing, additional thermal shunts or wood particles can be placed on the forming platform between the spirals before pressing.

Penetrating Thermal Bridges

An alternative form of thermal bridge exploits the compression step in the panel manufacturing process. Heat conducting elements that are initially separate are brought together forcefully during pressing and are fixed in place by curing of the binding agent.

Penetrating Pressed Sheet

As an example of a penetrating thermal bridge and as an embodiment of the present invention, penetrating members (teeth, edges or spikes) are pressed from aluminum sheet and are continuous with that sheet. In an instance, aluminum sheet is slit into a uniform array of cross-shaped slits. Each cross of slits is pressed at right angles to the plane of the sheet to form four vertical V-shaped teeth, where the angle of the V is a right angle. By crossing three cuts and pressing, six teeth are formed each with a V-shape of 60 degrees. By using more cuts, more teeth can be formed.

Alternatively, aluminum sheet is slit in an array of pairs of slits and each pair of slits is joined in the middle by a right-angle cut, a diagonal cut or by a zigzag cut. When the sheet between the cuts is pressed at right angles to the plane of the sheet, vertical flaps are formed with straight, guillotine and saw-tooth profiles respectively.

In all these instances, to enable effective penetration of the mat without deformation of the thermal bridge:

The pressed sheet can be made of a hard alloy such 2000 series or 7000 series aluminum. These alloys can contain up to 15% of other metals, notably including copper and zinc respectively. Increased hardness is at the price of reduced thermal conductivity.

The aluminum sheet can be cut at an angle so that the edge of the penetrating member is sharp.

Before cutting the aluminum sheet, each area to be cut can be stretch-pressed into a curve, so that each penetrating member is curved around the vertical axis.

In all these instances, the manufacturing process for the penetrating pressed sheet is simple and material wastage is insignificant.

Drawn Edges and Spikes

Alternatively, the sheet is pressed and drawn to form an array of circular edges or an array of conical indentations. Circular edges are more crush-resistant than linear edges and so permit the use of penetrating bridges with less aluminum or softer (and more conductive) aluminum. Conical indentations (or spikes) are especially suited to penetrating wood composite with a ply structure: any linear edge will interfere with at least one ply layer. Additionally a conical geometry is crush-resistant. Conical indentations of 15 mm length (the thickness of typical OSB subfloor) or more, pressed out of thin sheet, require a malleable alloy: for example 3000 series, as used in deep drawing of aluminum cans. Circular edges and conical indentations both require use of female draw cavities so that the metal is molded and not simply stretched thinner. Multiple drawings are required.

A sheet with an array of conical indentations must also have an array of small holes punched in it if it is used as the upper layer of a pre-press mat. The small holes allow air to be evacuated when pressing the mat.

In all these instances of penetrating pressed sheet, it is preferable to have a pattern of pressing that is staggered to avoid forming aligned cuts in the panel with consequent weakening.

In all these instances, the height of the penetrating members is at least the thickness of the final panel.

Aluminum sheet is placed on a protective plate on the forming platform and wood fiber is poured on to the sheet until the mat has reached its desired thickness. Preferably the aluminum sheet is a malleable alloy. The protective plate can be a thin panel of wear-resistant hardened steel. Such steel can have a Mohs hardness that is up to three times higher than aluminum. The penetrating pressed sheet is placed on top of the mat with the penetrating members facing vertically downwards. During hot pressing the penetrating members are driven into forceful contact with the lower aluminum sheet. Edges penetrate the lower aluminum sheet and are molded into the sheet by the hard protective plate. The assembly is fixed in place by curing of the binding agent.

The result is a uniform array of effectively seamless rectangular thermal bridges through the panel.

Pressing with Soft Resilient Layer

In an alternative adaptation of the standard manufacturing process, the panel is pressed using a soft resilient layer. Penetrating pressed sheet is arranged on a forming platform, with penetrating members pointing upwards. The fiber mat is placed on the array of members. On top of the mat is a plain aluminum sheet and on top of the sheet is a soft resilient layer and above this layer is a hardened steel plate. The steel plate can be attached to the top face of the press. The penetrating members are longer than the final thickness of the panel. In a cold press cycle, the members pierce the mat, the aluminum sheet and the soft layer to create an array of members that project through the aluminum sheet. The soft layer is removed and the upper surface of the aluminum sheet is sprayed with bonding agent. The array of projections is folded over by a roller and then the panel is hot-pressed so that the projections are laminated to the aluminum sheet. Bonding of aluminum under pressure reduces the contact resistance to a low value. The soft layer is usable for a limited number of press cycles and should be cheap. As an example, the soft layer can be a resilient natural or mineral felt. The used felt retains value as material for insulation and as filler for composite board.

By using a sufficient density and length of penetrating members, the folded over members can act as a heat-collecting or diffusing layer, so that the upper aluminum sheet can be omitted. This solution is a variant of the flapped pressed sheet method described under plasterboard. Because this version of thermal bridge is seamless, there is no contact resistance.

Penetrating Troughs and Caps

As an alternative to using a pressed sheet, the penetrating members can be made individually and arranged in an array. For example, the individual member can have a 'bottle-cap' shape that is easily mass-produced to the required depth on existing machinery. As another example the member can have the shape of a trough.

As an example of a penetrating bridge, in an embodiment of the present invention, aluminum sheet is cut into parallel strips and each strip is folded into an elongate trough shape with a rectangular U-shape cross-section. The walls of the U-shape have a height that is slightly more than the thickness of the finished panel. This is a simple procedure with no material wastage. A flat aluminum sheet is placed on the forming platform and the fiber mat is poured on to this sheet. A uniform array of troughs is placed on top of the mat, with the U-shape inverted. During hot pressing, the troughs penetrate the mat, come into forceful contact with the lower aluminum sheet and are fixed in place. The result is a uniform array of seamless rectangular thermal bridges across the panel.

Penetrating Pressed Sheet Used in Uncompressed Setting Layers

Penetrating pressed sheet can also be used for uncompressed setting layers such as plasterboard, wet screed and dry screed. In an example, a penetrating pressed aluminum sheet is placed on a horizontal forming platform, with the penetrating members upright. The paste for dry screed panel is poured on to the pressed sheet until the required thickness is achieved. The penetrating members are sufficiently long to project above the paste. The paste is allowed to set, then a plain sheet of aluminum is arranged to cover the array of tips of the projecting members and a hardened steel plate is placed on the plain sheet. Downward pressure is applied to the plain sheet so that the tips of the penetrating members are driven into the plain sheet and molded into the sheet.

The result is a uniform array of effectively seamless rectangular thermal bridges through the panel.

Particleboard

Variations of the methods described so far can also be applied in the manufacture of particleboard.

The advantages listed above for plasterboard as a radiant surface also apply to particleboard. Particleboard is widely used as a subfloor, as a layer in engineered wood flooring and is also used, usually as a laminate, in wall and ceiling panels.

Particleboard is available in a range of thicknesses: from 2 mm (⅛ inch) to 40 mm (1⅜ inch). 19 mm is a typical thickness for subfloor.

The thermal conductivity of particleboard varies with density, varying from 0.07 watts/m° C. to 0.18 watts/m° C.

Temperature Drop

From equation 3, the temperature drop for 19 mm light particleboard subfloor over a radiant heating or cooling source, for Q=50 to 100 watts/m² is:

delta $T$=(50-100)×0.019/0.07=13.5° C. to 27° C.

Without thermal bridging through the subfloor, it is not efficient to run an under-floor radiant system with the heating or cooling source under a particleboard subfloor.

The larger and elongate particles of particleboard prevent the easy flow of particles around an embedded thermal bridge. Solutions include thermal bridges with crushed shunts and penetrating bridges.

Deformed Spirals

As an example of a crushed thermal bridge, a uniform and aligned array of rectangular spirals of aluminum wire is placed on a forming platform. The spirals are preferably oriented to reduce interference with elongate particles in the core of the mat. The axes of the spirals can be at right angles to the preferred orientation of the elongate particles, with gaps between spiral turns sufficiently wide to enable migration of elongate particles into the gaps. Alternatively the axes of the spirals can be aligned with the elongate particles and the spirals are prefilled with particles. The height of the spirals initially equals the height of the mat. Hot pressing deforms the vertical portions of the spirals. The result is a uniform array of seamless thermal bridges with rectilinear heat-collecting and heat-dispersing surfaces.

Penetrating Bridges

All the instances of penetrating bridges already described under fiberboard are applicable.

Oriented Strand Board (OSB)

The thermal bridging methods described in the case of particleboard above can also be applied in the manufacture of OSB.

The advantages listed above for plasterboard as a radiant surface also apply to OSB. OSB is widely used as a load-bearing constructional panel in floors, walls and ceilings.

OSB is commonly made in three layers. The thicknesses of three-layer OSB panel range from 6 mm (¼ inch) to 18.5 mm (¾ inch). OSB is available up to 38 mm. 15 mm is a typical thickness for subfloor.

The thermal conductivity of OSB is typically 0.13 watts/m° C.

Temperature Drop

From equation 3, the temperature drop for 15 mm OSB subfloor over a radiant heating or cooling source, for Q=50 to 100 watts/m² is:

delta $T$=(50-100)×0.015/0.13=6.3° C. to 11.5° C.

Without thermal bridging through the subfloor, it is not efficient to run an under-floor radiant system with the heating or cooling source under an OSB subfloor.

Deformed Spirals

The combination of the three layers with differing strand orientation makes it difficult to incorporate a single continuous thermal bridge that does not interfere with the mechanical properties of at least one layer of the OSB panel. In an alternative embodiment of this invention, pre-filled circular spirals of aluminum wire or strip are placed in each layer of the uncompressed mat, with the height of the spirals at least equal to depth of the mat in which the spiral is embedded. Adjacent layers have spirals with axes at right angles. Hot pressing deforms the circular spirals in each layer to flat ovoid spirals, The ovoid spirals in adjacent layers are forced together and fixed in place by curing of the binding agent. The result is a uniform array of effectively seamless and substantially rectangular thermal bridges across the three layers.

Perforated cylinders can be substituted for circular spirals. In this case, pre-filling can be achieved by folding perforated sheet into a curved trough, filling the trough with strands that are generally aligned with the trough and folding the trough into a cylinder. The perforated sheet can, for example, be flattened expanded aluminum mesh.

Penetrating Pressed Sheet

All the instances of penetrating bridges already described under fiberboard are applicable.

Such bridges may be applied across all the OSB layers at one time or separate bridges may be installed in each layer and then forced together.

In an example, a penetrating pressed sheet of aluminum, with upright penetrating members, is placed on the forming platform and three layers of strands are poured on to the sheet. An aluminum mesh is placed on top of the mat. During hot-pressing, the strands are penetrated, these penetrating members come into forceful contact with the upper aluminum layer and are fixed in place by curing of the binding agent. The result is a uniform array of effectively seamless and substantially rectangular thermal bridges across the three layers.

In an alternative example, an aluminum sheet is placed on the forming platform. The lower layer of strands is poured on to this sheet. A penetrating pressed sheet of aluminum is placed on this lower layer with penetrating members pointing downwards and these members having edges aligned with the general orientation of strands in the lower layer.

The middle layer of strands is poured and a penetrating pressed sheet of aluminum is placed on this middle layer with penetrating members pointing downwards and these members having edges aligned with the general orientation of strands in the middle layer.

The upper layer of strands is poured and a penetrating pressed sheet of aluminum is placed on this upper layer with penetrating members pointing downwards and these members having edges aligned with the general orientation of strands in the upper layer.

During hot pressing, the members penetrate the layers of the mat and are forced together and in the lower layer, members are forced against the lower sheet, and fixed in place by curing of the binding agent. The result is a uniform array of effectively seamless and substantively rectangular thermal bridges across the three layers.

Plywood

Plywood is used in floors, walls and ceilings. As an example, plywood provides a stabilizing layer for floor coverings such as tile and linoleum. Where there is underfloor radiant heating this layer represents a significant thermal resistance, which can be reduced by thermal bridging.

Conventional plywood is not a molded product. Instead it is produced by peeling veneer from rotated logs and gluing veneers together at temperatures of at least 140° C. and pressures of 80 to 300 psi. Again there is an opportunity to use this compression to form an effective thermal bridge across the plywood panel.

Penetrating Pressed Sheet

In an embodiment of the present invention, before pressing, a stack of veneers is placed on a sheet of aluminum. On the upper face of the stack of veneers is arranged a penetrating pressed sheet of aluminum with penetrating members pointing downwards. In the hot press, the troughs are driven through the veneers into forceful contact with the lower aluminum sheet and fixed in place. The result is a uniform array of seamless rectangular thermal bridges.

To assist penetration, veneers can be temporarily softened, for example by spraying with an aqueous solution of plasticizer.

By staggering the array of penetrating members in both dimensions of the panel, the risk of splitting a veneer is reduced.

Engineered Wood Floorboard

If cost and low thermal resistance were the only criteria, most floors would be covered by thin vinyl. Aesthetic appeal means that wood flooring is often preferred in domestic living spaces. But wood is a thermal insulator. At peak heat flows, the temperature drop across a thick wood floor can rise to over 9° C. Since the surface temperature needs to be around 21-23° C., this requires a subsurface temperature over 30° C., exceeding the limits set by most wood-floor suppliers to avoid potential problems of warping. European regulations, dating to 2001, limit the temperature drop across the floor, including any underlay or further covering, to 7.5° C. The problem is worsened by use of rugs. The warping risk is greatly reduced by using an engineered wood floor, comprising an upper veneer of hardwood bonded to one or more lower layers of less expensive softwood, plywood or fiberboard. But the large temperature drop remains and this reduces the efficiency of the heating system.

Temperature Drop

A typical engineered wood floorboard comprises 1 to 6 mm of hardwood veneer bonded to 8 to 13 mm of other wood material. As an example, the hardwood veneer is 4 mm, the other wood material is 10 mm, and average thermal conductivity is K=0.14 watts/m ° C.

From equation 3, the temperature drop across the floor for Q=50 to 100 watts/m² is:

delta $T=(50-100) \times 0.014/0.14 = 5°$ C. to $10°$ C.

The upper hardwood layer cannot be thermally bridged without changing its appearance. Thermal bridging is therefore applicable only to the lower layers of the engineered wood floor. As a result, bridging offers diminishing returns. In the example given, even if the thermal resistance of the lower layers is reduced to zero, there will be a temperature drop of:

$(5-10) \times 4/14 = 1.4°$ C. to $2.8°$ C.

Thermal Bridging

In an embodiment, engineered wood floor is thermally bridged by using thermally bridged wood composite such as high density fiberboard for the layers below the hardwood veneer. Any of the methods already described for bridging wood composite can be used. The composite can be molded to be the entire layer below the hardwood veneer, including molded tongue and groove.

Molded Ceramic Bridge

In another embodiment, layers of wood below the hardwood veneer are bridged by heat-conducting ceramic. For example, the thermal conductivity of porcelain of standard commercial composition can be improved to K=2 watts/m° C. by extended heating at higher than normal temperatures. The result is inexpensive porcelain with increased density and lower porosity. This is 20× the thermal conductivity of, for example, pine. Therefore a thermal shunt of porcelain bridging just 5% of the area of a softwood layer can halve the temperature drop across this layer. The ceramic thermal shunt can be bonded to a heat-collecting layer and a heat-dispersing layer that are both aluminum sheet. This embodiment can be described as a tile/board hybrid: having the desirable thermal properties of tile combined with the desirable appearance and handling of tongue and groove floor board.

Wrapped Sections

In another embodiment, engineered wood floor is thermally bridged by:

Dividing the lower layers of the floorboard into elongate sections.

Wrapping heat-conducting sheets round each section and bonding the sheets to the wood Bonding the sections together.

In this instance, the three elements of the thermal bridge are all provided by the same continuous sheets.

By increasing the number (ie reducing the width) of the wrapped elongate bonded sections in a floorboard, the number of thermal shunts embedded in the floorboard is increased and the overall thermal path across the board is shortened, so improving heat transfer performance. However, the cost of manufacture and material wastage is also increased. Therefore it can be advantageous to use fewer elongate sections per floorboard and to fix additional thermal shunts between the bonded sections: for example, fixing molded ceramic shunts between sections.

Trials

In a series of trials, foils of different thicknesses were wrapped around insulating segments of different thicknesses and the temperature drops were compared.

In an example, an engineered floorboard 125 mm wide was created from a top 'veneer' of 3.8 mm plywood and a core of 12 mm MDF. The MDF was split into two longitudinal sections and each section was wrapped in a 0.15 mm layer of high-purity aluminum foil, crossing the thickness of the MDF only on the inside of the board. The volume of aluminum used was 2.7% of the total volume of the board. The temperature drop across the modified floorboard was reduced by approximately 50% compared with the untreated floorboard.

Laminate Floorboard

In another embodiment of the present invention, the cladding is a laminate floorboard. This differs from an engineered wood floorboard by not having a hardwood veneer. Instead, the upper surface comprises a decorative layer, usually simulating wood, protected by a transparent wear layer of paper impregnated with melamine resin. Below this is a core layer usually of fiberboard. Below the core layer is a stabilizing layer of resin-saturated paper.

Laminate floors are usually 8-10 mm thick and can be up to 12 mm thick. The wear layer is from 1 to 4 mm thick and the decorative layer is 0.2-0.3 mm thick.

An alternative laminate has an upper surface of decorative vinyl, a core layer of fiberboard, usually HDF and a lower layer of cork. The thickness of these layers is typically 2 mm, 7 mm and 1 mm respectively.

In an example of melamine laminate, the laminate board core and stabilizing layer is 8 mm thick and has an average thermal conductivity of 0.10 watts/m° C.

Temperature Drop

From equation 3, the temperature drop across the core for $Q=50$ to 100 watts/m² is:

delta $T$=(50-100)×0.008/0.10=4° C. to 8° C.

The wear layer is 3 mm thick. The thermal conductivity of the wear layer is 0.4 watts/m ° C. The temperature drop across this is only 0.1-0.2° C. Therefore a thermal shunt across the core layer has a potentially large effect on temperature drop across the whole board.

As an embodiment, the core layer (for example, particleboard or fiberboard) has embedded thermal bridges as already described. If a honeycomb thermal shunt is used as previously described for plasterboard, with a reduction in temperature drop of 70%, then the overall temperature drop is reduced from 4.1° C.-8.2° C. to 30%×(4° C. to 8° C.)+(0.1° C. to 0.2° C.)=1.3° C. to 2.6° C. ie an overall reduction of 68%

The options for thermal bridging of laminate floorboard are the same as the options for thermal bridging of engineered wood floorboard.

Carpet Underlay

Underlay for carpet improves 'feel', wear and insulation and under wood or laminate floors provides resilience, acoustic and thermal insulation and a buffer against an uneven subfloor. Such underlay is flexible and compressible and typically made of sponge or crumb rubber or plastic foam or wood fiber or felt. Typical underlay of this kind has a thickness from 2 mm to 6 mm under wood and 4 mm to 12 mm under carpet. The thermal conductivity of uncompressed nitrile rubber sponge is around 0.04 watts/m ° C. The conductivity of plastic foam or felt can be less than this; the conductivity of a dense crumb can be slightly more.

Temperature Drop

From equation 3, the temperature drop across typical 6 mm carpet underlay for $Q=50$ to 100 watts/m² is:

delta $T$=(50-100)×0.006/0.04=7.5° C. to 15° C.

This is not suitable for efficient under-floor heating.

By using carbon filler and a dense rubber sponge, thermal conductivity has been increased in a commercial product to 0.087 watts/m ° C. For a thickness of 6 mm, from equation 3, the associated temperature drop is:

delta $T$=(50-100)×0.006/0.087=3.5° C. to 7.0° C.

Combined with the temperature drop across typical carpet, this remains too high for an efficient radiant heating system.

Thermal Bridges for Pliable Cladding

A requirement for underlay is that the thermal bridges be pliable and compliant with repeated cycles of compression. Aluminum sheet is a suitable material, having a typical fatigue life of several million cycles. An embedded honeycomb is unsuitable since it cannot flex. Embedded wires are also unsuitable because the wires when flexing will tend to cut the surrounding material. Embedded thermal bridges described in previous sections are applicable, using flexible heat-conducting material, including:

Rectangular spiral strips where the strips are wide and flat
Rectangular rolls of mesh
Rectangular corrugated flat mesh, for example, flattened expanded aluminum sheet
Rectangular folded L-shapes, including use of a flapped pressed sheet
Rectangular loop pressed sheet where the loops are wide
Embedded cuboids
Wrapped and bonded sections
Penetrating pressed sheet.

Extruded Underlay

In an example, underlay is manufactured by extruding foam plastic or rubber on to a moving belt and passing it through rollers. The plastic or rubber can be laminated with polymer or natural fiber layers.

In an example of the present invention, rectangular spirals of aluminum strip are fed on to the moving belt to form a uniform planar array. Foam is extruded on to the spirals and penetrates between the coils of the spirals. The spirals are the same height as the desired thickness of the underlay. The open structure of the spirals—ie the gaps between adjacent coils of the spirals—means that the cured foam of the underlay forms a continuous coherent mass. When the foam has set, the result is a uniform array of seamless rectangular thermal bridges across the underlay.

The spirals can be substituted by rectangular rolls of aluminum mesh, for example, flattened expanded aluminum. The spirals can also be substituted by a rectangular corrugated aluminum mesh or by a pressed aluminum sheet with rectangular loops or by a pressed aluminum sheet with flaps. In the last case, the flaps project above the foam layer. When the foam has set, the flaps are folded over by a roller to lie flat on the top surface of the foam layer.

Underlay is also manufactured by using granulating recycled rubber tires, or recycled plastic foam.

Rubber Crumb

In the former case, fine rubber granules (crumb) are mixed with aqueous latex and poured on to a textile or paper backing. The mixture is skimmed to the desired thickness and cured by heat. Aluminum spirals, mesh rolls, corrugated sheet or pressed sheet can all be covered by the aqueous latex-crumb mixture before curing to form uniformly distributed seamless rectangular thermal bridges across the underlay.

Rebonded Plastic Foam

In the latter case, shredded foam is mixed with a polyurethane binder and compressed and cured. In a batch process, the mix is pressed in a cylindrical mold. The resulting solid cured 'log' is then rotated and peeled into layers by a cutter. In a continuous process, the mix is pressed between rollers and the solid cured sheet is peeled into layers. Individual layers may be laminated to a plastic film or non-woven backing.

In a variation of this continuous process, cured sheet is produced at the desired thickness without peeling. This permits the underlay to be thermally bridged by the methods already described.

Wrapped Sections

Peeled foam underlay can be thermally bridged by cutting into sections, wrapping in aluminum sheet and bonding the sections back together.

Penetrating Pressed Sheet Using Soft Resilient Layer

Peeled foam can also be thermally bridged by using penetrating pressed sheet as described under the fiberboard section. A layer of peeled foam is arranged on a penetrating pressed aluminum sheet, with the penetrating members pointing vertically up. These members are longer than the final thickness of the foam. On the upper side of the peeled foam is laminated a plain sheet of aluminum. On top of the aluminum is a layer of resilient felt, made, for example, of wool. The sandwich of felt, aluminum sheet, peeled foam and penetrating pressed sheet is compressed so that the penetrating members pass through the foam and the plain aluminum sheet and into the felt. After pressing, the felt layer is removed for later use, leaving penetrating members projecting through the foam. The upper surface of the plain aluminum sheet is sprayed with bonding agent. A roller is passed over the peeled foam and folds the projecting penetrating members on to the plain sheet. The sandwich is then pressed again and the folded members and sheet are bonded together under pressure.

Since both foam and felt are easily penetrated, the required penetrating pressed sheet can be much thinner than is needed for penetrating wood composite. Using a sufficiently dense and long array of penetrating members, the upper aluminum sheet can be dispensed with, since the members become the upper heat-conducting surface. This is a variant of thermal bridging using flaps, as described for plasterboard.

Any weakening of the foam layer caused by penetration is easily compensated by laminating the foam to a tough backing layer, for example, non-woven fabric, before placing the foam layer on the penetrating pressed sheet.

The result is a uniform array of seamless rectangular bridges across the plastic foam underlay.

Rollability of Bridged Underlay

Underlay is stored and distributed in rolled form. The thermal bridges described here can accommodate rolling. For example, an array of parallel spirals embedded in foam rubber or plastic or in rubber crumb in cured latex allows rolling in a direction at right angles to the spiral axes. Likewise, penetrating pressed sheets can be applied in parallel strips, so allowing rolling in a direction at right angles to the strips.

Trial

In a trial, 10 mm rubber crumb carpet underlay was completely wrapped in 100 mm sections with soft 0.05 mm aluminum tape and the sections were then taped together. The volume of aluminum used was 1.1% by volume of the taped underlay. The temperature drop across the underlay was reduced by 50% at the section seams and by 16% at the section midpoints or around 30% on average. The average temperature drop across the underlay could be increased by increasing the density of seams (ie reducing the width of taped sections) and/or by increasing the thickness of the aluminum tape.

Tufted Carpet and Carpet Tiles

Over 70% of all carpet sold in the US and Europe is tufted. It is manufactured by inserting yarn through a primary backing fabric, cementing the yarn in place and then covering the primary fabric with a secondary backing fabric. The yarn is cut to create a tufted pile. The yarn fiber may be natural (usually wool) or artificial (usually nylon, polypropylene, polyester or acrylic) or a combination of these. The backing fabrics may be woven or non-woven. A typical tufted carpet has a tuft depth of around 8 mm and a total backing thickness of 3 mm. Carpet tiles typically have shorter tufts: between 3 and 5 mm with a 3 mm backing layer of vinyl reinforced with glass fiber. The yarn may be left looped.

Temperature Drop

The thermal resistance of carpets is usually described by the tog rating, defined as 10× the temperature drop that transmits one watt per m². Typical domestic tufted carpets have tog ratings between 1 and 2. The temperature drop for $Q=50$ to 100 watts/m² is therefore:

delta $T=(50\text{-}100)\times(1\text{-}2)/10=5°$ C. to $10°$ C. for the lower tog rating and $10°$ C. to $20°$ C. for the higher tog rating The upper end of this range is unacceptable for an efficient under-floor heating system.

The backing layer is usually made of natural and/or artificial fibers and latex. Thermal conductivities for relevant materials: polypropylene, jute and latex are 0.22 watts/m° C., 0.05 watts/m° C. and 0.14 watts/m° C. respectively. The overall conductivity is assumed to be 0.15 watts/m° C.

From equation 3, the estimated temperature drop across the backing layer alone is:

delta $T=(50\text{-}100)\times0.003/0.15=1°$ C. to $2°$ C.

The backing therefore represents 10-20% of the thermal resistance of the carpet.

The British Standard EN 1264 advises a maximum tog of 1.5 for carpet and underlay together, implying that many combinations of carpet and underlay are unsuitable for heated floors. However, a 2005 study by the UK Building Services Research Association (BSRA) indicates that carpet tog ratings are systematically over-stated: the BSRA tog results for a sample of tufted carpets plus underlay are, on average, 40% below the published figures. This implies that the backing layer represents as much as 30% of the thermal resistance of the carpet.

Reducing Thermal Resistance of Carpet; Prior Art

The thermal resistance of tufted or looped carpet may be reduced by:

Using shorter tufts or loops.

Using a lower density of tufting.

Changing the composition of the yarn. For example, by adding synthetic graphite to Nylon 6-6, the thermal conductivity can be increased from 0.3 watts/m° C. to 1.8 watts/m° C.

Changing the composition of the materials of which the primary and secondary backing layers are made.

Changing the composition of the adhesives used.

Using thermal bridging in the backing layers.

Prior art describes electrically conductive carpet intended to avoid build-up of static charge. Such carpet typically uses yarn with carbon-coated fibers that will conduct a charge of several thousand volts to a backing that is made electrically conductive using a carbon-impregnated latex or by also using carbon-coated fibers. Carbon-coated fibers limit the appearance of the yarn, which may not be important in commercial applications but is unacceptable in domestic use. This arrangement will not conduct significant amounts of heat. Prior art describes electrically conductive yarn using 20-50% by weight of electrically conductive filler, attached to a backing made of resin with similar quantities of conductive filler. Large percentages of electrically conductive filler also improve thermal conductivity but require significantly more added conductive material than an efficient thermal bridge, Prior art also describes attaching a very thin metal foil layer to the underside of the backing so that the foil grounds any static voltage in the yarn. This arrangement on its own does not increase the transfer of heat through the backing.

Folded Thread Loops

In an embodiment of the present invention, the backing is thermally bridged by an adaptation of the standard manufacturing process:

Incorporating heat-conducting threads into the primary backing layer: this becomes the heat-dispersing layer.

Incorporating heat-conducting threads into the secondary backing layer: this becomes the heat-collecting layer.

Weaving or pulling loops of heat-conducting thread out of the lower side of the primary backing layer. If the heat-conducting threads are loose in the primary backing layer then they will be pushed out when tufts are pushed through the backing. When latex solution is sprayed on to the primary backing layer to anchor the tufts, these loops project through the latex. When the secondary backing layer is added, the loops are bent over. The loops are the thermal shunt.

Instead of using latex, hot-melt glue can be used: for example, by including hot-melt fibers in the primary backing layer.

This method is a variation of the thermal bridge already described that is based on bending an L-shaped strip in a molded cladding.

Conductive Granules

In another embodiment of the present invention, the backing is thermally bridged by another adaptation of the standard manufacturing process:

Incorporating heat-conducting threads into the primary backing layer: this becomes the heat-dispersing layer.

Incorporating heat-conducting threads into the secondary backing layer: this becomes the heat-collecting layer.

Incorporating heat-conducting spherical granules into the cement that joins the primary and secondary backing layers. The granules have a diameter equal to the gap between primary and secondary backing layers. The diameter is greater than the spacing between threads in the backing layers, so that the granules are trapped between these layers. As a result of cementing under compression, the granules migrate to the voids between tufts and provide a thermal shunt that connects the heat-dispersing layer with the heat-collecting layer. In the case of standard 3 mm backing, the granule diameter is around 1.5 mm.

This method is a variation of the thermal bridge already described using heat-conducting shapes with a cross-section equal to the width of the bridged cladding layer.

In an embodiment, the heat-conducting threads are high-purity aluminum wire and the heat-conducting granules are smooth spheres of high-purity aluminum. The aluminum wire can be anodized to improve radiant heat transfer.

The heat-conducting threads can also be polymer fiber filled with conductive particles: for example, polypropylene loaded with graphite. The heat-conducting granules can be graphite.

In an embodiment, a heat-conducting foil is bonded to the top of the primary backing layer: this becomes the heat-dispersing layer. The foil is soft and is perforated by the tufting process. A heat-conducting foil is bonded to the bottom of the secondary backing layer: this becomes the heat-collecting layer. In an embodiment, these foils are high-purity aluminum.

Penetrating Pressed Sheet

Thermal bridges across tufted carpet backing can also be constructed using a version of the penetrating pressed sheet already described under fiberboard. Penetrating pressed sheet is laminated to the secondary backing layer so that the penetrating members penetrate the secondary backing layer. Liquid latex is applied to the secondary backing layer so that the penetrating members project through the latex. The primary backing layer incorporates aluminum threads and so is heat-conducting. Tufts are inserted in the primary backing layer and this tufted layer is pressed down on the latex. The penetrating members engage with the aluminum threads in the primary backing layer. The latex is cured. The resulting layers comprise, in sequence: tufted yarn, heat-conducting primary backing layer, cured latex bridged by penetrating members, secondary backing layer, base of penetrating pressed sheet.

The result is a uniform array of rectangular thermal bridges.

The described thermal bridges also prevent the build-up of static charge in the carpet.

BRIEF DESCRIPTION OF DRAWINGS

All figures are schematic and not to scale.

All figures illustrate embodiments of thermal bridges in cladding.

DETAILED DESCRIPTION OF INVENTION

Figure 1A:
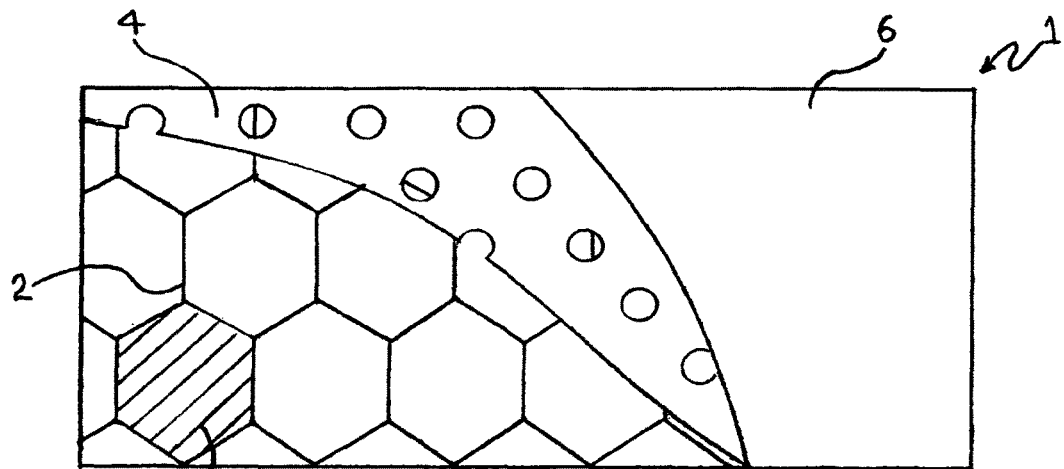
FIG. 1a: cut-away plan view: panel with thermal bridge using honeycomb aluminum as a thermal shunt.

FIG. 1*a*: cut-away plan view: panel (1) with thermal bridge using honeycomb (2).

This figure is cut away to show the separate layers of a panel of molded cladding (1) that, for example, can be plasterboard or fiberboard. The panel (1) has an embedded thermal shunt that is an aluminum honeycomb (2). The cells of the honeycomb (2) are filled with the material or filler (3) of the cladding (1). (Only one cell is shown filled in the plan view). The filler (3) can be plaster or can be wood particles combined with resin or can be another moldable constructional material such as, for example, cement. The honeycomb (2) is bonded by adhesive to a first heat collecting/dispersing layer (4) that is aluminum sheet laminated to the lower side of the panel (1) (not shown in the plan view) and to a second heat collecting/dispersing layer (5) that is aluminum sheet laminated to the upper side of the panel (1). In the case of plasterboard, the heat-conducting layers (4 and 5) allow drying of the plaster, for example, by being perforated, as shown in the plan view. The outer layers of the plasterboard are paper (6). The honeycomb (2) and the laminated sheets (4, 5) constitute a uniform array of rectangular thermal bridges across the panel (1).

Figure 1B:
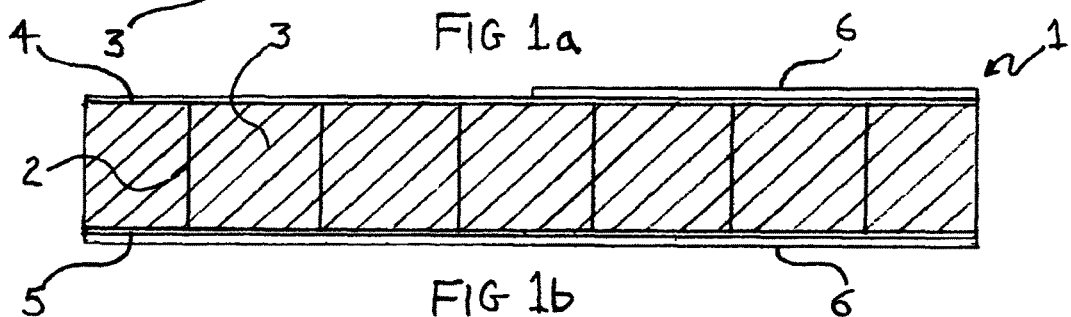
FIG. 1b: cross-section of panel with thermal bridge using honeycomb.

FIG. 1*b*: cross-section of panel (1) with thermal bridge using honeycomb (2).

Figure 2A:
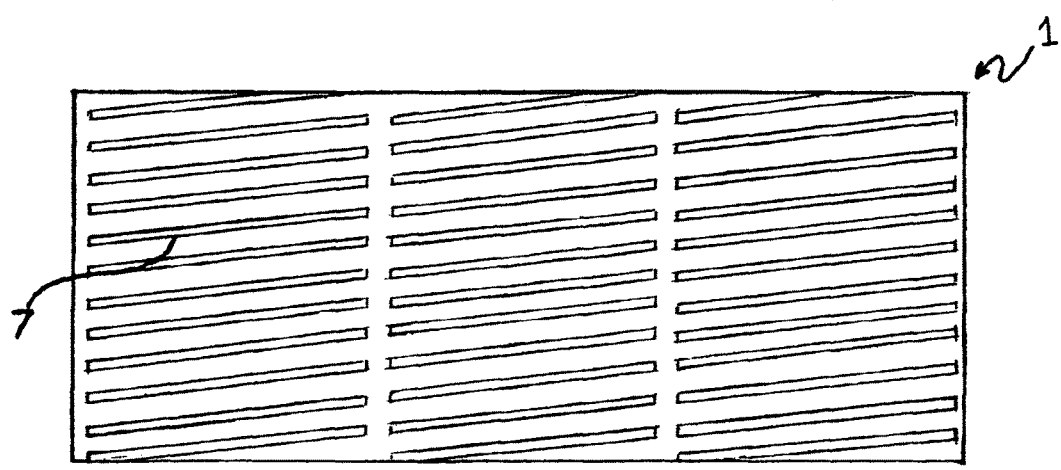
FIG. 2a: plan view: top of panel with thermal bridge using rectangular aluminum spirals.

FIG. 2*a*: plan view: top of panel (1) with thermal bridge using rectangular spirals (7).

A panel of molded cladding (1) has an embedded thermal bridge that is a row of rectangular spirals (7) made of aluminum wire or strip. The spaces between the turns of the spirals (7) are filled with the filler (3) of the cladding (1) (the filler is not shown in the plan view). The upper edges of the spirals (7) serve as a first heat collecting/dispersing layer (4) and the lower edges of the spirals serve as a second heat collecting/dispersing layer (5). The spirals (7) constitute a uniform array of seamless rectangular thermal bridges across the panel (1). Using almost the same figure, spirals (7) can be substituted by rolls (or cylinders) of aluminum mesh (not shown), also with a rectangular cross-section. Cylinders of rolled mesh are referenced in FIGS. 8*d* and 8*e*.

Figure 2B:
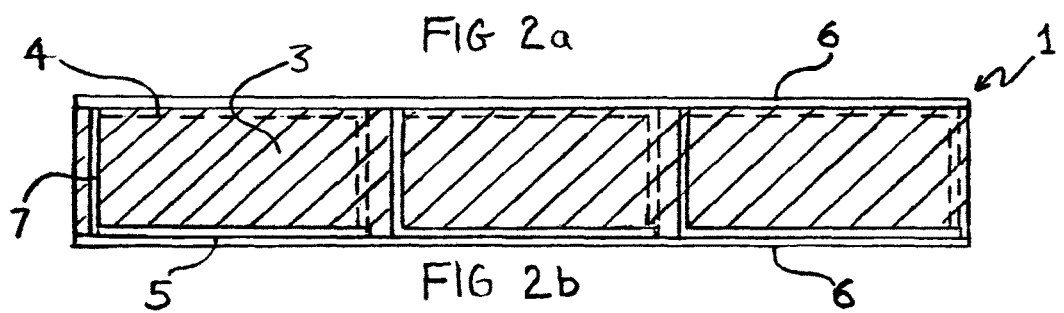
FIG. 2b: cross-section of panel with thermal bridge using rectangular aluminum spirals.

FIG. 2*b*: cross-section of panel (1) with thermal bridge using rectangular spirals (7).

An almost identical figure would show the spirals (7) substituted by rolls (or cylinders) of aluminum mesh (not shown), also with a rectangular cross-section.

In this instance, the panel (1) is plasterboard and has outer layers of paper (6)

Figure 3A:
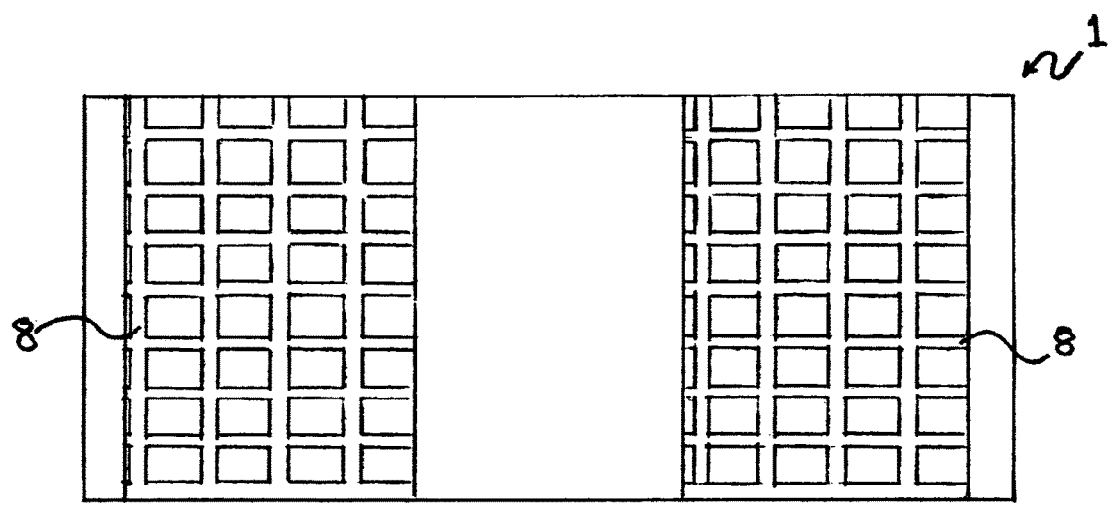
FIG. 3a: plan view: panel with thermal bridge using rectangular corrugated aluminum mesh.

FIG. 3*a*: plan view: panel (1) with thermal bridge using rectangular corrugated mesh (8).

An aluminum mesh (8) has corrugations with a rectangular profile. The mesh (8) can be substituted by an expanded sheet or by a perforated sheet. The voids in the corrugation are filled with the filler (3) of the cladding (1) (the filler is not shown in the plan view). The upper surface of the mesh (8) serves as a first heat collecting/dispersing layer (4) and the lower surface of the mesh (8) serves as a second heat collecting/dispersing layer (5). The mesh (8) constitutes a uniform array of seamless rectangular thermal bridges across the panel (1).

Figure 3B:
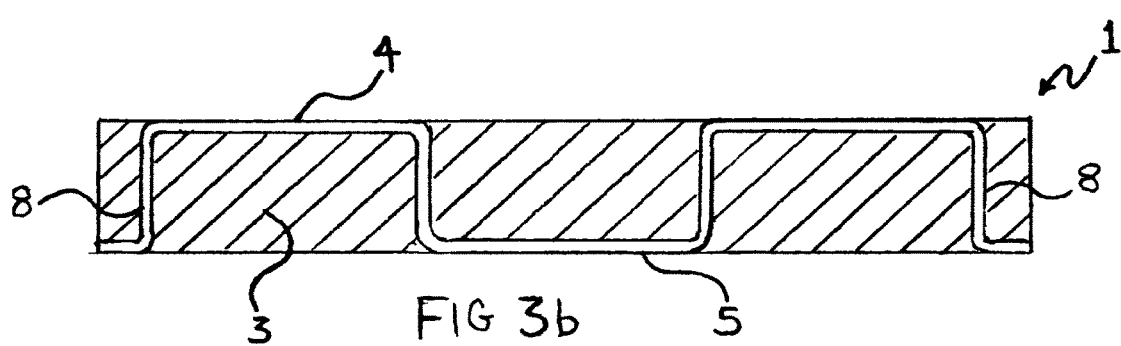
FIG. 3b: cross-section of panel with thermal bridge using rectangular corrugated aluminum mesh.

FIG. 3*b*: cross-section of panel (1) with embedded rectangular corrugated mesh (8).

Figure 4A:
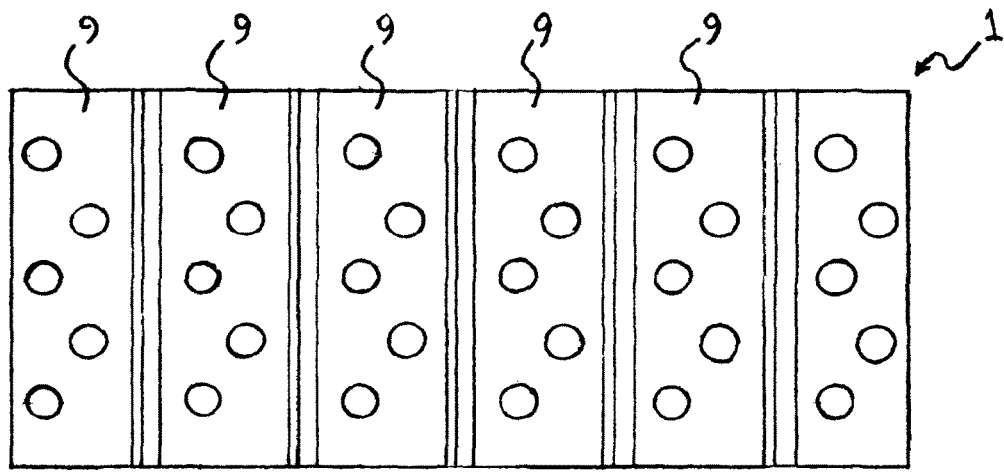
FIG. 4a: plan view: array of L-shaped aluminum strips.

FIG. 4*a*: plan view: array of L-shaped strips (9).

L-shaped strips (9) of aluminum sheet are bonded to a lower layer (6): in the example of plasterboard, this layer (6) can be paper. The strips are shown with perforations to assist cohesion with the moldable filler (3, not shown)

Figure 4B:
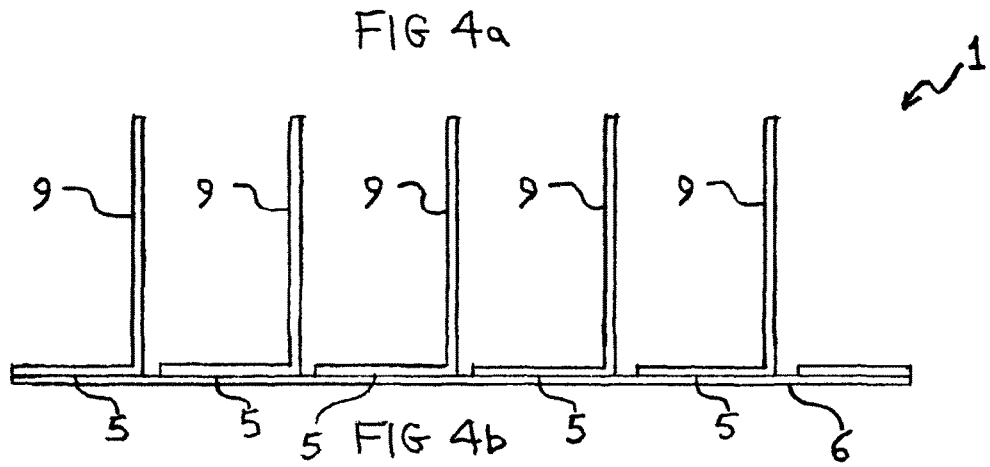
FIG. 4b: cross-section of array of L-shaped strips before moldable filler is added.

FIG. 4*b*: cross-section of array of L-shaped strips (9) before moldable filler (3) is added. The lower portions of the L-shaped strips (9) are the second heat collecting/dispersing layer (5).

Figure 4C:
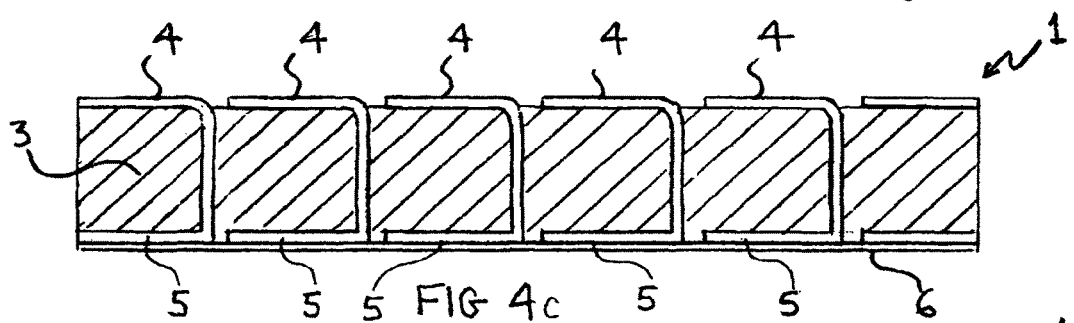
FIG. 4c: cross-section: L-shaped strips embedded in a molded panel and bent into a rectangular reverse C shape.

FIG. 4*c*: cross-section: L-shaped strips (9) embedded in a molded panel (1) and bent into a rectangular reverse C shape.

The upper portions of the strips (9) are laminated against the top surface of the panel (1). The upper portions of the L-shaped strips (9) are a first heat collecting/dispersing layer (4). The lower portions of the L-shaped strips (9) are a second heat collecting/dispersing layer (5). The folded C-shaped strips form a uniform array of seamless rectangular thermal bridges across the panel (1)

Figure 4D:
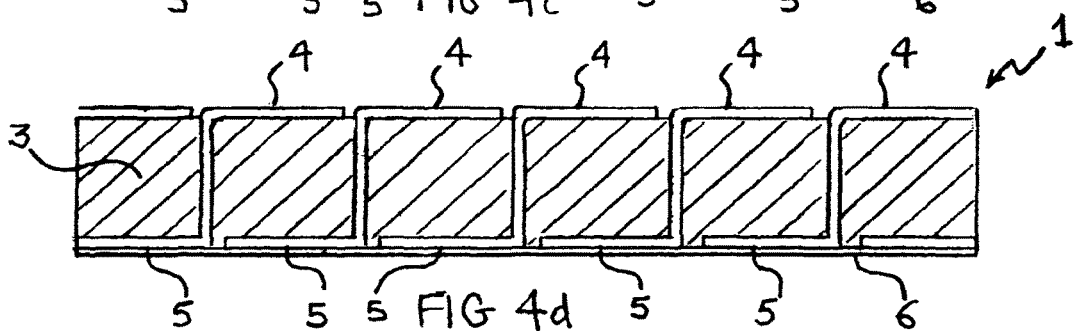
FIG. 4d: cross-section: L-shaped strips embedded in a molded panel and bent into a rectangular S shape.

FIG. 4*d*: cross-section: L-shaped strips (9) embedded in a molded panel (1) and bent into a rectangular S shape.

The upper portions of the strips (9) are laminated against the top surface of the panel (1). The upper portions of the L-shaped strips (9) are a first heat collecting/dispersing layer (4). The lower portions of the L-shaped strips (9) are a second heat collecting/dispersing layer (5). The folded S-shaped strips form a uniform array of seamless rectangular thermal bridges across the panel (1)

Figure 5A:
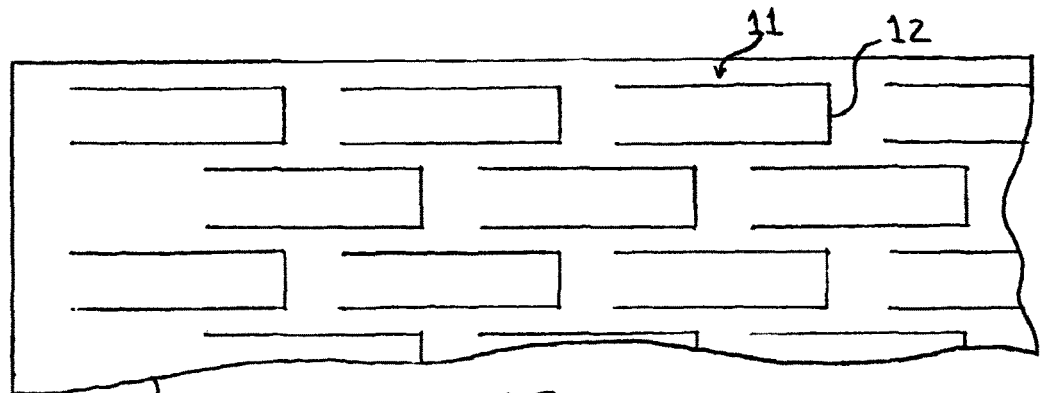
FIG. 5a: plan view: section of aluminum sheet with pattern of slits for flaps.

FIG. 5a: plan view: section of aluminum sheet (10) with pattern (11) of slits for flaps (13).

An aluminum sheet (10) has a uniform array of pairs of slits (11). Each pair of slits (11) has a linking cut (12) across one end.

Figure 5B:
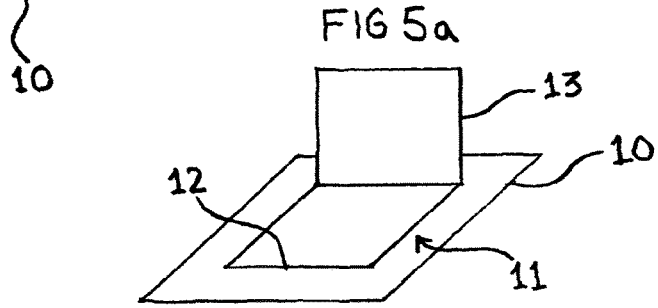
FIG. 5b: perspective view: individual raised flap.

FIG. 5b: perspective view: individual raised flap (13).

A flap (13) between each pair of slits (11) in an aluminum sheet (10) is lifted to a vertical position. A uniform array (not shown) of such flaps (13) can be used in the same way as the L-shaped strips (9) (see FIGS. 4a to 4d) to form a uniform array of seamless rectangular thermal bridges across a panel (1).

Figure 5C:
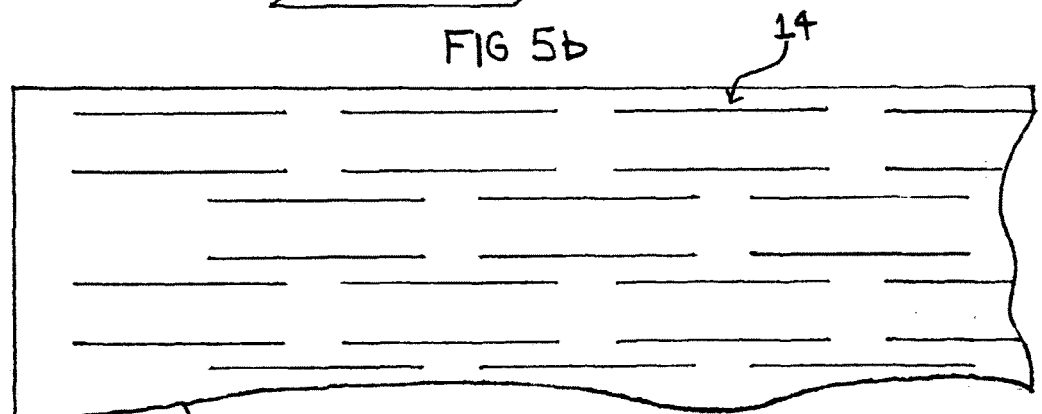
FIG. 5c: plan view: section of aluminum sheet with pattern of slits for loops.

FIG. 5c: plan view: section of aluminum sheet (10) with pattern (14) of slits for loops (15).

An aluminum sheet (10) has a uniform array of pairs of slits (14).

Figure 5D:
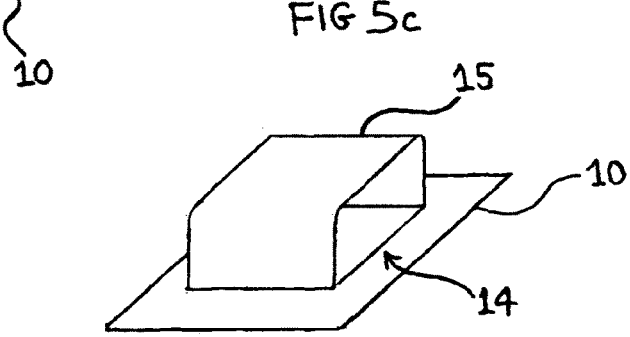
FIG. 5d: perspective view: individual raised rectangular loop.

FIG. 5d: perspective view: individual raised rectangular loop (15).

The sheet between each pair of slits (14) is pushed up to form a rectangular loop (15). An array (not shown) of such loops (15) can be embedded in a molded panel (1) (not shown) to form a uniform array of seamless rectangular thermal bridges.

Figure 6A:
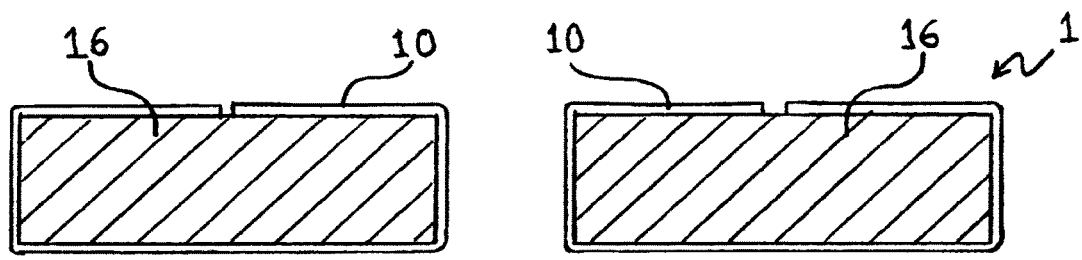
FIG. 6a: cross-section: wrapped separate sections of cladding panel.

FIG. 6a: cross-section: wrapped separate sections (16) of cladding panel (1).

Cladding panel (1) is divided into two sections (16). A aluminum sheet (10) is wrapped fully round each section (16) and bonded to each section (10)

Figure 6B:
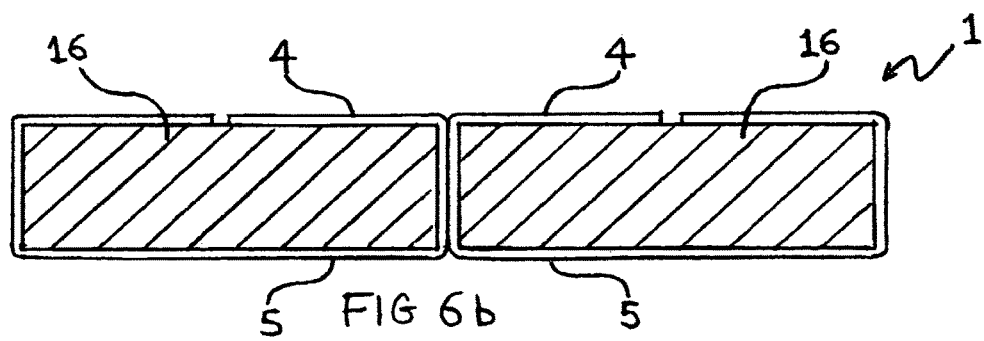
FIG. 6b: cross-section: wrapped sections of panel joined together.

FIG. 6b: cross-section: wrapped sections (16) of panel (1) joined together.

Two sections (16) of panel (1) are bonded together. The wrapped aluminum sheet (10) constitutes seamless rectangular thermal bridges across the panel (1)

Figure 6C:
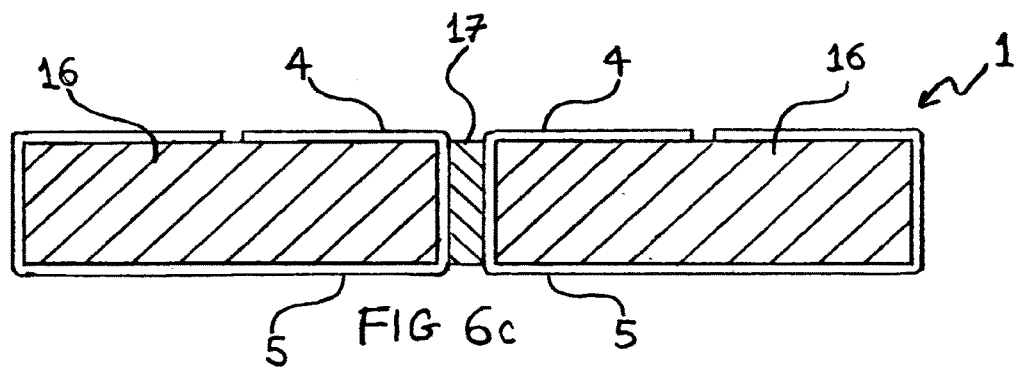
FIG. 6c: cross-section: wrapped sections of panel joined together with a ceramic shunt.

FIG. 6c: cross-section: wrapped sections (16) of panel (1) joined together with a ceramic shunt (17).

A molded porcelain thermal shunt (17) is bonded between the sections (16).

The number and width of sections (16), the thickness of the wrapping layer (10) and the material and geometry of the shunt (17) can all be varied.

Figure 7A:
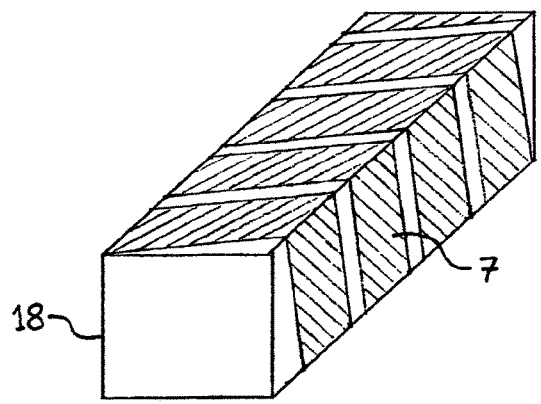
FIG. 7a: perspective view: single fiberboard cuboid wrapped in rectangular aluminum spiral.

FIG. 7a: perspective view: single fiberboard cuboid (18) wrapped in rectangular aluminum spiral (7)

Cuboids (18)—rods of fiberboard with a rectangular cross-section—are formed in a shaped hot press (not shown). The cuboids are wrapped in a rectangular aluminum spiral (7).

Figure 7B:
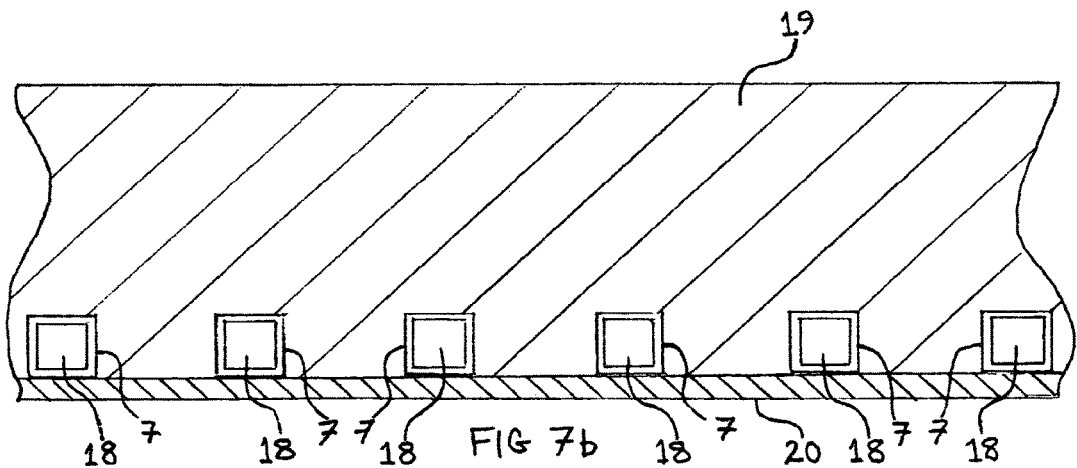
FIG. 7b: cross-section: cuboids embedded in pre-press mat.

FIG. 7b: cross-section: cuboids (18) embedded in pre-press mat (19).

Fiberboard cuboids (18) wrapped in aluminum spiral (7) are arranged in a uniform array on a forming platform (20) with gaps (21) between the cuboids (18).

Figure 7C:
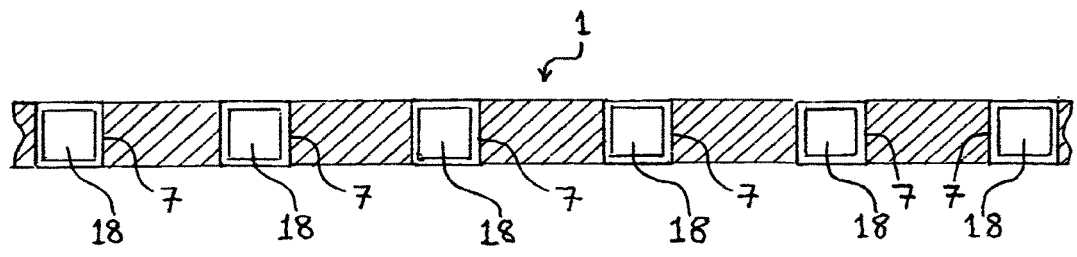
FIG. 7c: cross-section: cuboids embedded in panel.

FIG. 7c: cross-section: cuboids (18) embedded in panel (1).

During pressing, the pre-press mat (19) flows into the gaps (21) between the cuboids (18).

The result is a uniform array of seamless rectangular thermal bridges across the panel.

Figure 8A:
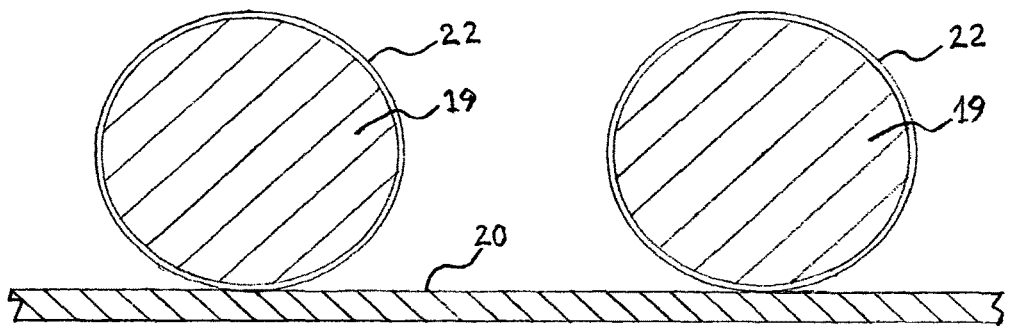
FIG. 8a: cross-section: array of circular aluminum spirals filled with pre-press mat.

FIG. 8a: cross-section: array of circular spirals (22) filled with pre-press mat (19).

An array of aluminum spirals (22) (two are shown) of circular cross-section is filled with the pre-press mat (19).

Figure 8B:
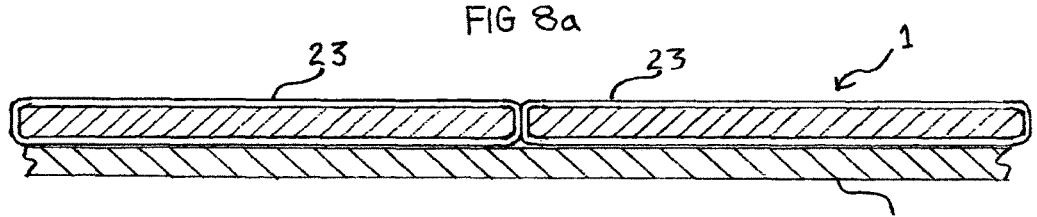
FIG. 8b: cross-section: array of spirals deformed into ovoid spirals in panel.

FIG. 8b: cross-section: array of spirals deformed into ovoid spirals (23) in panel (1).

During hot-pressing, the pre-press mat (19) is compressed by a ratio of 5-10×. Adjacent circular spirals (22), filled with fibers, are deformed by pressure into flat ovoid spirals (23) and fixed in place by curing of a binding agent. The ovoid spirals (23) are forced into contact. A series of parallel flat ovoid spirals (23) constitute a uniform array of seamless, rectangular thermal bridges across the panel (1).

Figure 8C:
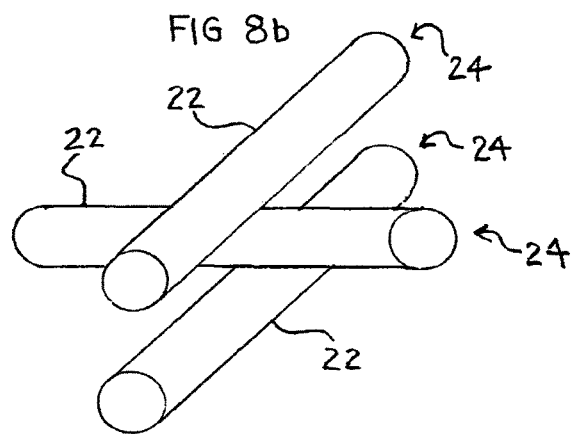
FIG. 8c: perspective view: circular spirals in vertical arrangement for three-ply panel.

FIG. 8c: perspective view: circular spirals (22) in vertical arrangement for three-ply panel (1).

A pre-press mat (19) for an OSB panel comprises three layers (24) of circular spirals (22) (single spirals shown) each filled with wood strands (24, not shown) that are generally oriented along the axes of each spiral (22). Spirals (22) in each layer (24) are arranged in a uniform planar array (not shown) at right angles to spirals (22) in adjacent layers (24).

During hot-pressing, the spirals (22) deform into ovoid spirals (23, not shown), are pressed forcefully against adjacent spirals (22), are fixed in place by curing of a binding agent and form a uniform array of effectively seamless, near-rectangular thermal bridges across the panel (1).

Figure 8D:
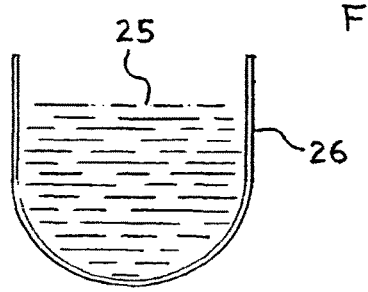
FIG. 8d: cross-section: curved aluminum mesh trough filled with wood strands.

FIG. 8d: cross-section: curved aluminum mesh trough (26) filled with wood strands (25).

A curved trough (26) is made by folding perforated aluminum sheet, for example, flattened expanded aluminum mesh. The trough (26) is filled with wood strands (25), with the strands (25) generally aligned with the longer dimension of the trough (26).

Figure 8E:
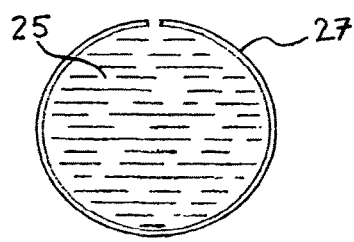
FIG. 8e: cross-section: curved aluminum mesh trough folded to form cylinder.

FIG. 8e: cross-section: curved aluminum mesh trough (26) folded to form cylinder (27).

The curved trough (26) shown in FIG. 8d is folded over to form a perforated aluminum cylinder (27). A uniform array of such pre-filled cylinders (27) is placed on the forming platform (not shown). During hot pressing, the cylinders (27) deform into cylinders with a flat ovoid cross-section (not shown). The flattened cylinders (not shown) are fixed in place by curing of a binding agent and form a uniform array of effectively seamless, rectangular thermal bridges across the layer (not shown). Pre-filled cylinders (27) can be used to thermally bridge three-layer OSB using the arrangement described in FIG. 8c.

Figure 9A:
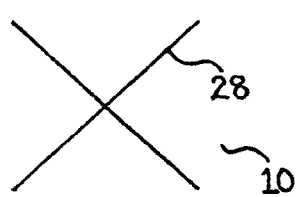
FIG. 9a: plan view: single cross-shaped cut in aluminum sheet.

FIG. 9a: plan view: single cross-shaped cut (28) in sheet (10).

An aluminum sheet (10) is cut with a staggered pattern (not shown) of cross-shaped cuts (28).

Figure 9B:
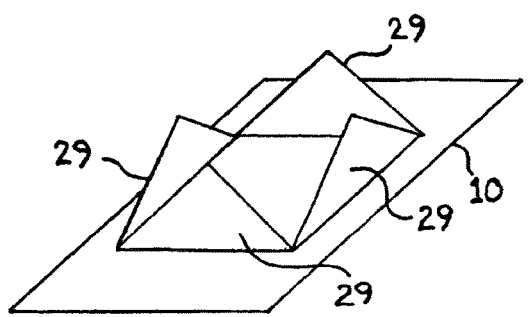
FIG. 9b: perspective view: teeth raised from single cross-shaped cut.

FIG. 9b: perspective view: teeth (29) raised from single cross-shaped cut (28).

The cross-shaped cuts (28) in the aluminum sheet (10) are pushed up to form an array (not shown) comprising four teeth (29) from each cross-shaped cut (28). The sheet (10) and the array of teeth (29) comprise a penetrating pressed sheet (42, not shown).

Figure 9C:
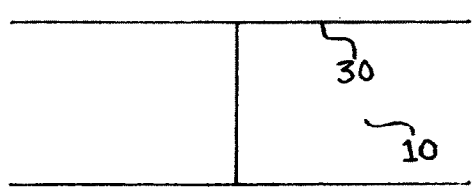
FIG. 9c: plan view: single H-shaped cut in aluminum sheet.

FIG. 9c: plan view: single H-shaped cut (30) in sheet (10).

An aluminum sheet (10) is cut with a staggered pattern (not shown) of H-shaped cuts (30).

Figure 9D:
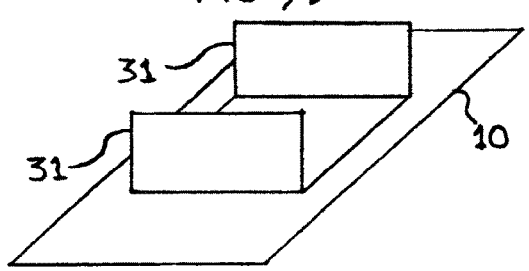
FIG. 9*d*: perspective view: straight edges raised from H-shaped cut.

FIG. 9d: perspective view: straight edges (31) raised from H-shaped cut (30).

The H-shaped cuts (30) in the aluminum sheet (10) are pushed up to form an array (not shown) comprising two edges (31) from each H-shaped cut (30). The sheet (10) and the array of edges (31) comprise a penetrating pressed sheet (42, not shown).

Figure 9E:
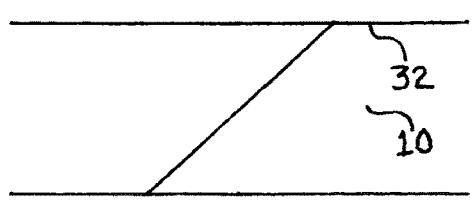
FIG. 9*e*: plan view: single H-shaped cut with slanted cross cut in aluminum sheet.

FIG. 9e: plan view: single H-shaped cut with slanted cross cut (32) in sheet (10)

An aluminum sheet (10) is cut with a staggered pattern (not shown) of H-shaped cuts with slanted cross cut (32).

Figure 9F:
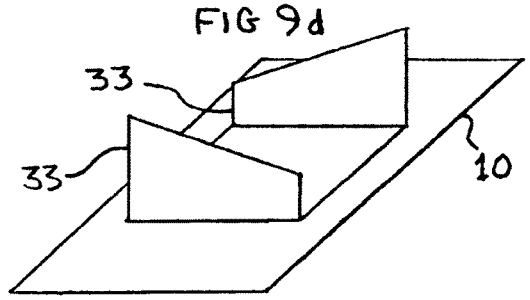
FIG. 9*f*: perspective view: guillotine edges raised from slanted H-shaped cut.

FIG. 9f: perspective view: guillotine edges (33) raised from slanted H-shaped cut (32).

The H-shaped cuts (32) in the aluminum sheet (10) are pushed up to form an array (not shown) comprising two guillotine edges (33) from each H-shaped cut (32). The sheet (10) and the array of edges (33) comprise a penetrating pressed sheet (42, not shown).

Figure 9G:
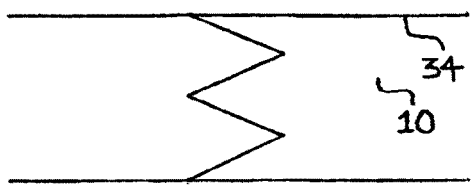
FIG. 9*g*: plan view: single H-shaped cut with zigzag cross cut in aluminum sheet.

FIG. 9g: plan view: single H-shaped cut with zigzag cross cut (34) in sheet (10).

An aluminum sheet (10) is cut with a staggered pattern (not shown) of H-shaped cuts with zigzag cross cut (34)

Figure 9H:
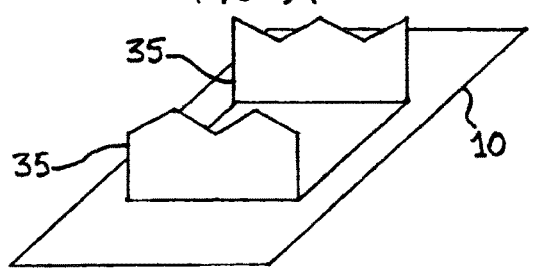
FIG. 9*h*: perspective view: saw-tooth edges raised from H-shaped cut with zigzag cross cut.

FIG. 9h: perspective view: saw-tooth edges (35) raised from H-shaped cut with zigzag cross cut (34).

The H-shaped cuts (34) in the aluminum sheet (10) are pushed up to form an array (not shown) comprising two saw-toothed edges (35) from each H-shaped cut (34). The sheet (10) and the array of edges (35) comprise a penetrating pressed sheet (42, not shown).

Figure 9I:
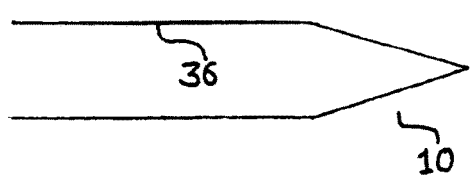
FIG. 9*i*: plan view: single V-headed cut at the end of parallel cuts in aluminum sheet.

FIG. 9i: plan view: single V-headed cut at the end of parallel cuts (36) in sheet (10).

An aluminum sheet (10) is cut with a staggered pattern (not shown) of V-headed cuts at the end of parallel cuts (36).

Figure 9J:
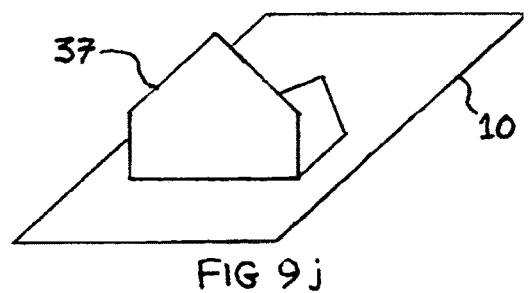
FIG. 9*j*: perspective view: aluminum sheet with single raised V-headed member.

FIG. 9j: perspective view: aluminum sheet (10) with single raised V-headed member (37).

The V-headed cuts (36) in the aluminum sheet (10) are pushed up to form an array (not shown) comprising a V-headed member (37) from each V-shaped cut (36). The sheet (10) and the array of V-headed members (36) comprise a penetrating pressed sheet (42, not shown).

Figure 10A:
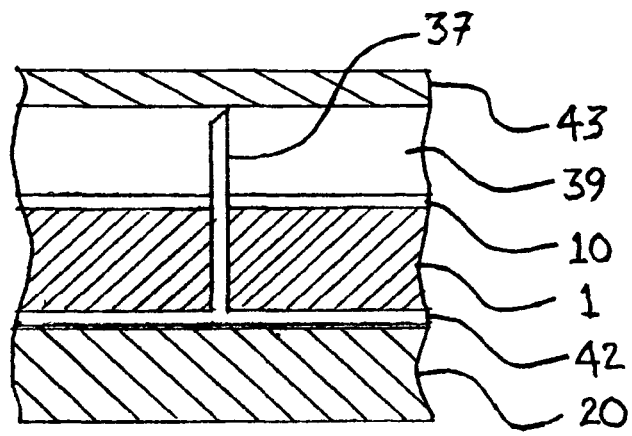
FIG. 10*a*: cross-section: single raised V-headed member penetrating hot-pressed panel and resilient felt layer.

FIG. 10a: cross-section: single raised V-headed member (37) penetrating hot-pressed panel (1) and resilient felt layer (39).

Arranged on a forming platform (20) is a penetrating pressed sheet (42) with a uniform array of V-headed members pointing upwards (37, one only shown). Above the pressed sheet (42) are layers in the following sequence: a compressed panel (1), a plain aluminum sheet (10), a layer of resilient wool or mineral felt (39) and a plate of hardened steel (43). The cross-section shows the result of hot pressing. A mat (19, not shown) has been compressed to form the panel (1). The V-headed member (37) has penetrated the panel, including the aluminum sheet (10) and also the felt (39).

Figure 10B:
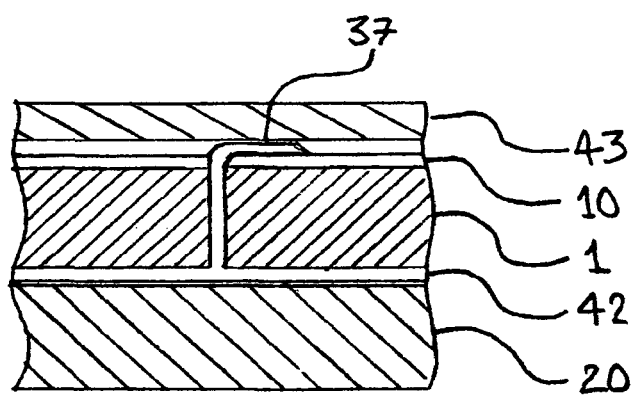
FIG. 10*b*: cross-section: single raised V-headed member folded and laminated to aluminum sheet.

FIG. 10b: cross-section: single raised V-headed member (37) folded and laminated to aluminum sheet (10).

The press has been released, the felt layer (39, not shown) has been peeled off the projecting V-headed member (37). The remaining layers have been compressed again so that the V-headed member (37) has been folded over and laminated against the aluminum sheet. (10)

Figure 11A:
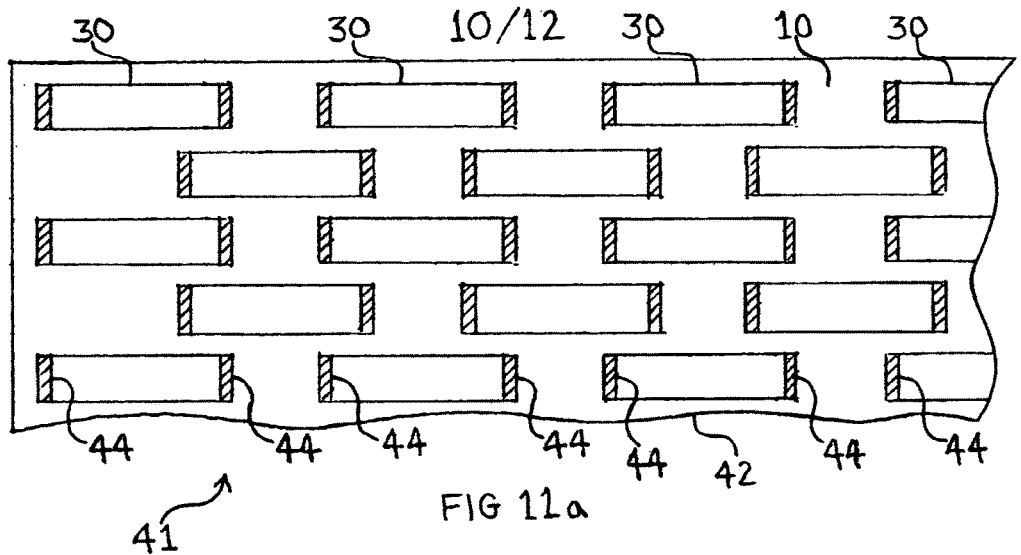
FIG. 11*a*: plan view: staggered pattern of H-shaped cuts on aluminum sheet.

FIG. 11a: plan view: staggered pattern (41) of H-shaped cuts (30) on aluminum sheet (10).

The pattern of cuts (41) is staggered so that the penetrating pressed sheet (42) is less likely to weaken the panel (1)

Figure 11B:
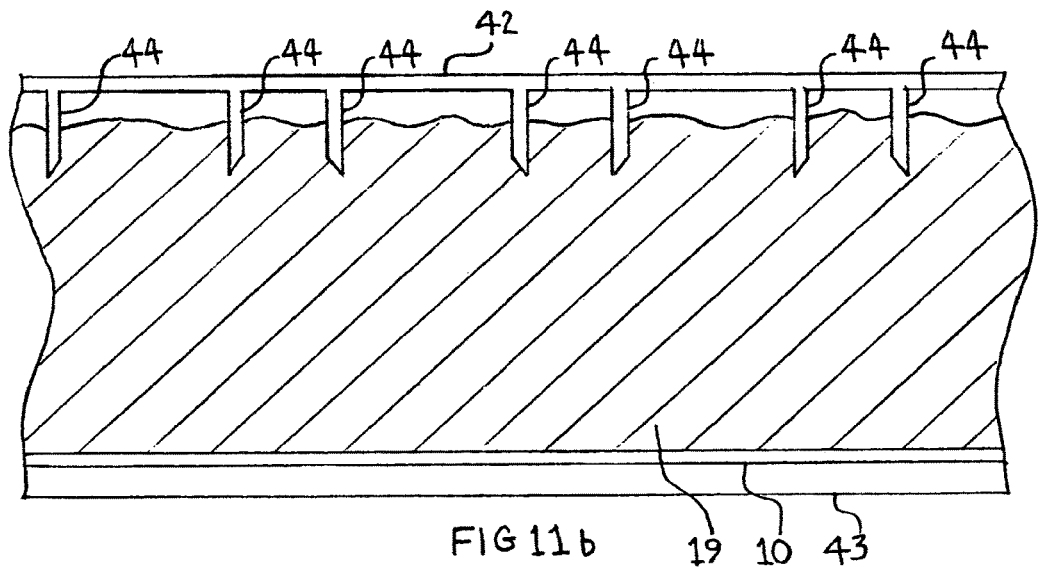
FIG. 11*b*: cross-section: penetrating pressed aluminum sheet on pre-press mat.

FIG. 11b: cross-section: penetrating pressed sheet (42) on pre-press mat (19).

A pre-pressed mat (19) is formed upon an aluminum sheet (10) that is placed on a steel plate (43), preferably made of hardened, wear-resistant steel. A penetrating pressed sheet (42) bearing an array of penetrating members (44) is placed on the top of a pre-press mat (19) with the members (44) facing downwards.

Figure 11C:
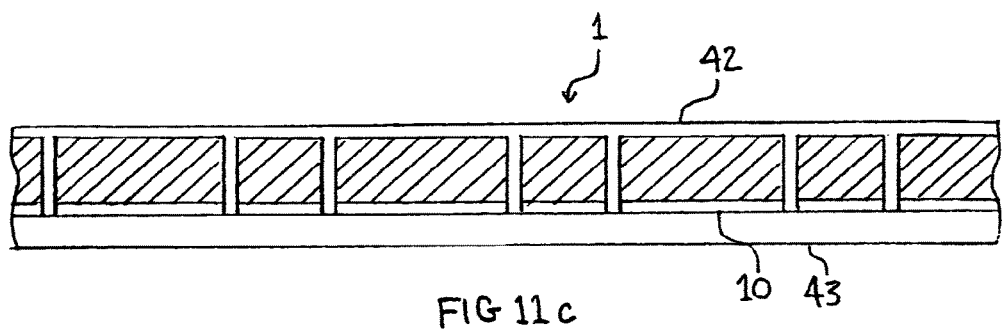
FIG. 11*c*: cross-section: penetrating pressed aluminum sheet embedded in panel.

FIG. 11c: cross-section: penetrating pressed sheet (42) embedded in panel (1).

During hot pressing, the penetrating members (44) are driven through the mat (19), come into forceful contact with the lower aluminum sheet (10) and are fixed in pace by curing of a binding agent. The steel plate (43) allows the penetrating members (44) to fully penetrate the aluminum sheet (10) without damage to the press (not shown). As a result a uniform array of effectively seamless, rectangular thermal bridges is formed across the panel (1).

Figure 12A:
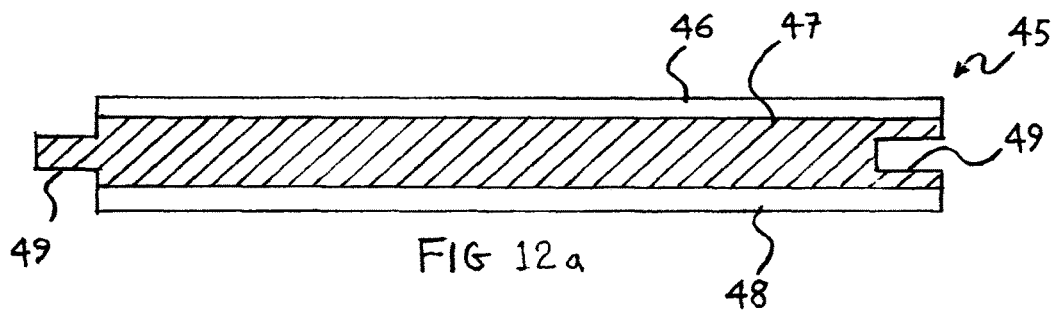
FIG. 12*a*: cross-section: engineered wood floorboard without thermal bridge.

FIG. 12a: cross-section: engineered wood floorboard (45) without thermal bridge.

An engineered floorboard (45) has an upper hardwood layer (46), a central core layer (47) and a lower stabilizing layer (48). The edges (49) of the floorboard (45) are shaped so that adjacent boards (45) interlock. The simplest interlock—tongue and groove—is shown. More complex interlock geometries can also be used.

Figure 12B:
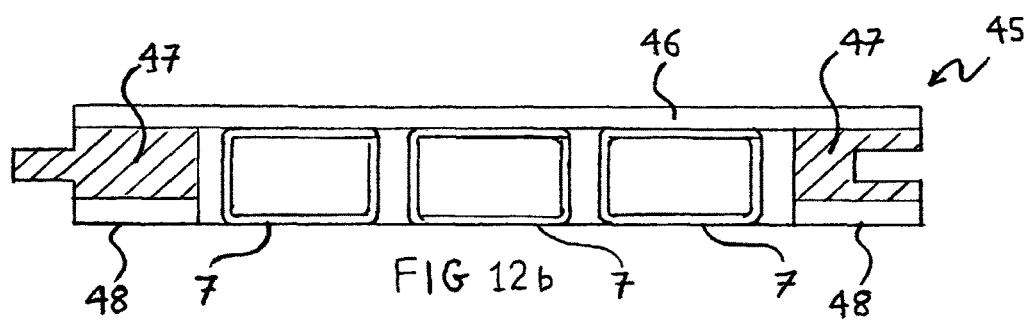
FIG. 12*b*: cross-section: engineered wood floorboard with lower layers thermally bridged by rectangular aluminum spirals.

FIG. 12b: cross-section: engineered wood floorboard (45) with lower layers thermally bridged by rectangular spirals (7).

An engineered wood floorboard (45) has a section of the core layer (47) and a section of the stabilizing layer (48) replaced by molded wood composite (50) in which there are embedded thermal bridges: in this case an array of rectangular spirals (7) of heat-conducting wire or strip, as described in FIGS. 2a and 2b. Other embedded thermal bridges described here can be used. The molded wood composite (50) can also replace all the core layer (47) including tongue and groove. (this variant not shown).

Figure 12C:
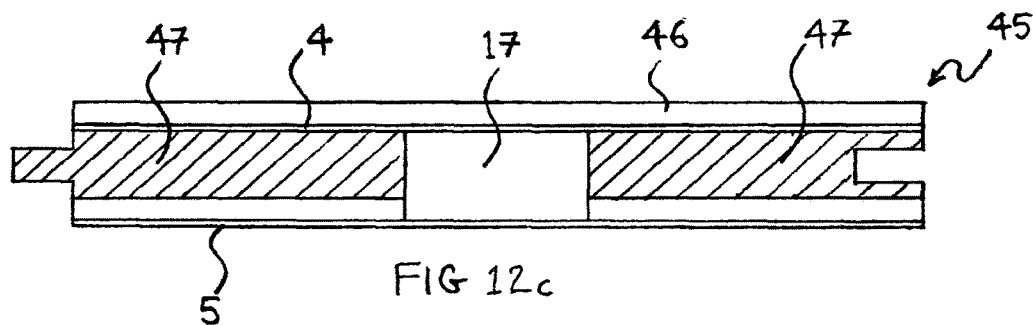
FIG. 12*c*: cross-section: engineered wood floorboard with lower layers thermally bridged by a ceramic thermal shunt and aluminum sheets.

FIG. 12c: cross-section: engineered wood floorboard (45) with lower layers thermally bridged by a ceramic thermal shunt (17) and aluminum sheets (10).

An engineered wood floorboard (45) has aluminum sheet (10) laminated between the upper hardwood layer (46) and the central core layer (47) and has aluminum sheet (10) laminated to the base of the stabilizing layer (48). The same sheet (10) is bonded to a ceramic thermal shunt (17).

Figure 12D:
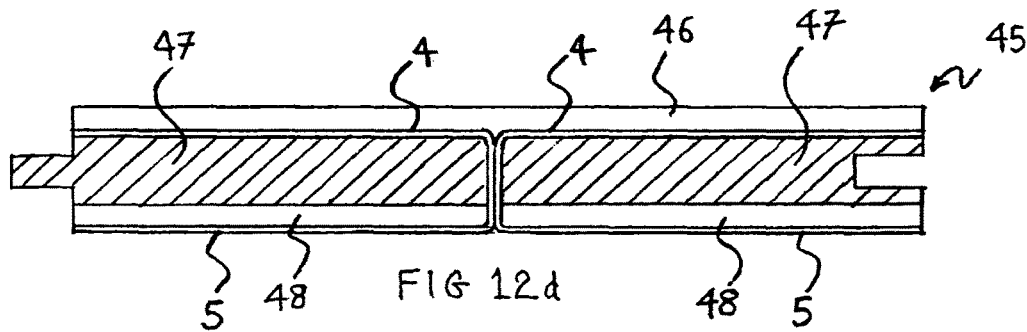
FIG. 12*d*: cross-section: engineered wood floorboard with sections thermally bridged by wrapped aluminum sheet.

FIG. 12d: cross-section: engineered wood floorboard (45) with sections thermally bridged by wrapped sheet.

An engineered wood floorboard (45) is the same as shown in FIG. 12c, except that a continuous aluminum sheet (10) is wrapped around sections of the core layer (47) and stabilizing layer (48). An additional thermal shunt (17) is omitted but can be included.

The thermal bridging methods applicable to engineered wood floorboards (45) are also applicable to laminate flooring (not shown). In laminate flooring the upper hardwood layer (46) shown in FIGS. 12a to 12d inclusive is replaced by a combination of protective and decorative upper layers.

Figure 13A:
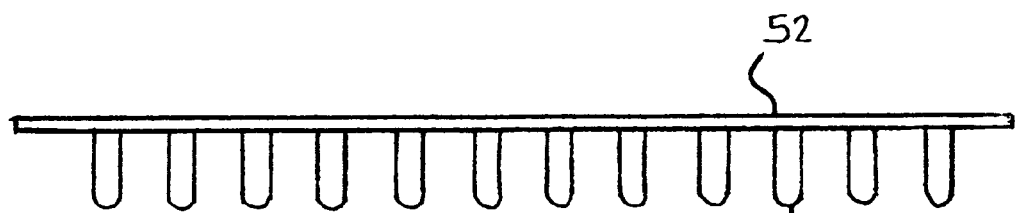
FIG. 13*a*: cross-section: aluminum thread loops projecting through carpet primary backing layer.

FIG. 13a: cross-section: aluminum thread loops (51) projecting through carpet primary backing layer (52).

Primary backing (52) for tufted or loop carpet comprises a net of fibers (not shown). Aluminum thread is woven through the primary backing layer (52) and protrudes in an array of loops (51).

Figure 13B:
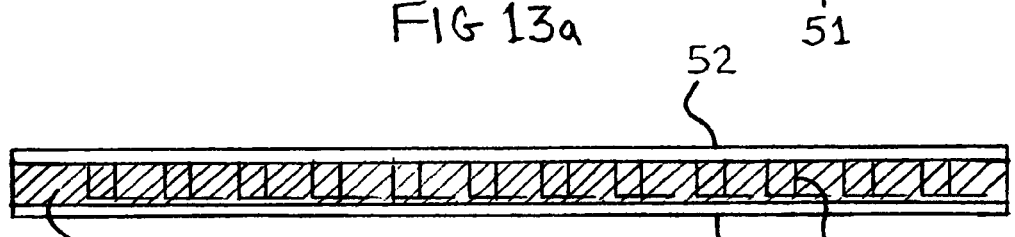
FIG. 13*b*: cross-section: aluminum thread loops embedded in carpet backing cement and folded against the secondary backing layer.

FIG. 13b: cross-section: aluminum thread loops (51) embedded in carpet backing cement (53) and folded against the secondary backing layer (54).

Laminated to the primary backing layer (52) is a layer of backing cement (53), for example, latex. The cement (53) anchors yarn (not shown), that has been pushed through the primary backing layer (52) and bonds to the secondary backing layer (54), which also comprises a net of fibers, including aluminum thread (not shown). The loops (51) are folded against the secondary backing layer (54). The loops (51) constitute thermal shunts, the primary backing (52) is the heat-dispersing layer, and the secondary backing (54) is the heat-collecting layer. In combination, the primary backing (52), the loops (51) and the secondary backing (54) constitute a distributed array of approximately rectangular thermal bridges.

Figure 13C:
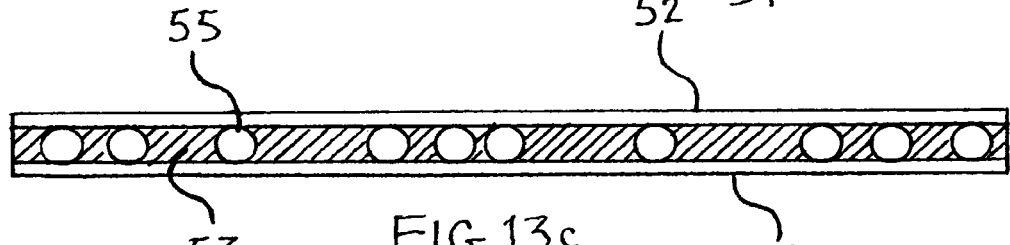
FIG. 13*c*: cross-section: aluminum granules embedded in carpet backing cement.

FIG. 13c: cross-section: aluminum granules (55) embedded in carpet backing cement (53).

The primary backing layer (52) and the secondary backing layer (54) both include aluminum thread (not shown). Heat-conducting spherical granules (55) are dispersed uniformly in the cement (53). The diameter of the granules (55) is slightly less than the overall width of the backing so that the granules (55) dispersed in the cement (53) provide a direct thermal path through the backing cement (53) between the two backing layers (52, 54), creating a distributed array of effectively rectangular thermal bridges across the carpet backing.

SCOPE OF INVENTION

A number of embodiments of thermal bridging are described here, with reference to particular forms of interior cladding and in general preferring aluminum as material for thermal bridges. It is envisaged that various details of the invention may be modified without departing from the spirit and scope of the invention. For example, other variants of interior cladding and other materials for thermal bridging can be considered to be within the scope of the invention. The foregoing descriptions of alternative embodiments of the invention are for illustration and not for the purpose of limitation.

The invention claimed is:

1. A method of prefabricating a cladding for radiant heat transfer, said cladding being individual layers or laminated multiple layers of material installable in or on the interior walls, ceilings or floors of a living space, whereby said cladding has an interior-facing surface and an exterior facing surface, the method comprising the steps of:
    assembling an at least one array of a plurality of thermal bridge elements, said elements being uniform in shape, size and spacing between said elements, each of said thermal bridge elements comprising a heat-collecting layer, a heat-dispersing layer and a thermal shunt and each of said array of said thermal bridge elements being constructed of a single piece of thermally conductive material, whereby said single piece of thermally conductive material remains a single piece and said thermal bridge elements in said array are each thermally linked to each other;
    arranging said thermal bridge elements to cover uniformly a portion of said interior-facing surface;
    arranging said array of thermal bridge elements with spaces in or between said elements such that when said array of thermal bridge elements is embedded in a primary cladding layer by molding, said primary cladding layer forms a coherent mass;
    molding said primary cladding layer around said thermal shunts so that said thermal shunts extend through and are embedded in said primary cladding layer, whereby said primary cladding layer comprises a heat absorbing side and a heat-emitting side and said thermal shunts are substantially at right angles to said primary cladding layer;
    arranging said heat-collecting layer of each of said thermal bridge elements to be contiguous with and in fixed contact with said heat absorbing side of said primary cladding layer;
    arranging said heat-dispersing layer of each of said thermal bridge elements to be contiguous with and in fixed contact with said heat-emitting side of said primary cladding layer;
    said primary cladding layer having a thermal conductivity of less than 2 W/m° C. and said thermal bridge elements having a thermal conductivity at least ten times greater than the thermal conductivity of said primary cladding layer.

2. A method of prefabricating a cladding for radiant heat transfer as claimed in claim 1, wherein the density of said primary cladding layer remains substantially unchanged during said molding step.

3. A method of prefabricating a cladding for radiant heat transfer as claimed in claim 1, wherein the density of said primary cladding layer is increased by pressing during said molding step.

4. A method of prefabricating a cladding for radiant heat transfer as claimed in claim 1, wherein said thermal bridge elements are made of aluminum (aluminium).

5. A method of prefabricating a cladding for radiant heat transfer as claimed in claim 1, wherein said thermal bridge elements comprise loops.

6. A method of prefabricating a cladding for radiant heat transfer as claimed in claim 1, wherein said thermal bridge elements comprise cuboids.

7. A method of prefabricating a cladding for radiant heat transfer as claimed in claim 1, wherein said thermal bridge elements comprise perforated corrugated material.

8. A method of prefabricating a cladding for radiant heat transfer as claimed in claim 1, wherein said thermal bridge elements comprise an array of flaps.

9. A method of prefabricating a cladding for radiant heat transfer as claimed in claim 8, wherein a plurality of said flaps is constructed from a single sheet of material such that said single sheet of material remains continuous and comprises a shared layer of said plurality of flaps.

10. A method of prefabricating a cladding for radiant heat transfer as claimed in claim 8, wherein said array of flaps is folded by means of at least one roller passing over said array of flaps.

11. A method of prefabricating a cladding for radiant heat transfer as claimed in claim 8, wherein a layer of non-cladding material abuts said primary cladding layer and said array of flaps is arranged to penetrate said primary cladding layer under compression and to emerge from said primary cladding layer into a said layer of non-cladding material, and said layer of non-cladding material is then removed and the emergent portions of said flaps are folded back and made contiguous with and fixed to the surface of said primary cladding layer.

* * * * *